United States Patent
Pangerl et al.

(10) Patent No.: US 11,694,286 B2
(45) Date of Patent: Jul. 4, 2023

(54) GENERATING RENTAL RATES IN A REAL ESTATE MANAGEMENT SYSTEM

(71) Applicant: THE BEEKIN COMPANY LIMITED, London (GB)

(72) Inventors: Christian Josef Pangerl, London (GB); Michael Kwun Ho Chan, London (GB); Vidur Gopesh Gupta, London (GB); Mitchell Gooding, Berlin (DE)

(73) Assignee: THE BEEKIN COMPANY LIMITED

( * ) Notice: Subject to any disclaimer, the term of this patent is extended or adjusted under 35 U.S.C. 154(b) by 159 days.

(21) Appl. No.: 16/719,166

(22) Filed: Dec. 18, 2019

(65) Prior Publication Data

US 2020/0211131 A1 Jul. 2, 2020

Related U.S. Application Data

(60) Provisional application No. 62/786,249, filed on Dec. 28, 2018.

(51) Int. Cl.
*G06Q 50/16* (2012.01)
*G06Q 30/0645* (2023.01)

(52) U.S. Cl.
CPC ........ *G06Q 50/16* (2013.01); *G06Q 30/0645* (2013.01)

(58) Field of Classification Search
None
See application file for complete search history.

(56) References Cited

U.S. PATENT DOCUMENTS

| | | | | |
|---|---|---|---|---|
| 2002/0065699 A1* | 5/2002 | Talluri | ............ | G06Q 10/06315 705/7.25 |
| 2015/0161636 A1* | 6/2015 | Williams | ........... | G06Q 30/0206 705/7.35 |
| 2020/0160413 A1* | 5/2020 | Rembert | ............ | G06Q 30/0201 |

OTHER PUBLICATIONS

Revenue Optimization for a Hotel Property with Different Market Segments: Demand Prediction, Price Selection and Capacity Allocation; Eduardo Candela Garza, 2017 (Year: 2017).*
5 Most Effective Hotel Room Pricing Strategies to Boost Revenue, hotelgix.com, 2016 (Year: 2016).*
Machine Learning Redefines Revenue Management and Dynamic Pricing in Hotel Industry, altexsoft.com, 2018 (Year: 2018).*
(Continued)

*Primary Examiner* — Dennis W Ruhl
(74) *Attorney, Agent, or Firm* — Dorsey & Whitney LLP

(57) ABSTRACT

A system may include a rental property listing portal and a rental price prediction unit. The rental price prediction unit may additional include an amenity price prediction unit. The rental price prediction unit and the amenity price prediction unit may use one or more mathematical models, such as constrained optimization model and/or a machine learning approach such as a random forest model, to generate a suggested rental price at a given level of portfolio occupancy. The system may also provide risk thresholds to simulate leasing strategies based on market situations, predicting revenue potential and possible vacancy for each strategy. The system may also generate a delist time (time to rent) for a property at a given price. The system and method may be implemented in a multi-family apartment rental system, a storage space rental system, a student accommodation, and single family apartment rental systems.

18 Claims, 29 Drawing Sheets

(56) References Cited

OTHER PUBLICATIONS

The evolution of price elasticity of electricity demand in South Africa: A Kalman filter application, R. Inglesi-Lotz, 2011 (Year: 2011).*

Price Elasticity and how it can influence room rates; 2018 (Year: 2018).*

* cited by examiner

| | | | | | | | | | | |
|---|---|---|---|---|---|---|---|---|---|---|
| ☐ RENT OPTIMIZER | | | | | | | | | | ∨ |
| ⊙ YOUR PORTFOLIO | | | | | | | | | | |
| ⚛ MARKET INTELLIGENCE | | | | | | | | | | |
| ᵢₗₗ REPORTS | | | | | | | | | | |

600

| ↓ SOMA (CA) | London (UK) | Lincoln Park (IL) | ↑ |
|---|---|---|---|
| 612 Occupancy (%) 83% | 614 ⬣ Total units rented 211 | 616 ← Monthly income ($) $253,200 | 618 ⊙ Rem length of stay (months) 11.00 |

Rent Estimates
[List] [Chart]

| | 27-Aug | 3-Sep | 10-Sep | 17-Sep | 24-Sep | 1-Oct | 8-Oct | 15-Oct | 22-Oct | 29-Oct |
|---|---|---|---|---|---|---|---|---|---|---|
| | | | | | | | | | | 602 |
| | | | | | | | | | | 604 |
| | $1211 | $1217 | $1223 | $1229 | $1235 | $1242 | $1248 | $1254 | $1260 | $1267 |
| | $1419 | $1426 | $1433 | $1440 | $1448 | $1455 | $1462 | $1469 | $1477 | $1484 |
| | | | | | | | | | | 606 |
| | $2317 | $2328 | $2340 | $2351 | $2363 | $2375 | $2387 | $2399 | $2411 | $2423 |
| | | | | | | | | | | 608 |
| | $2302 | $2267 | $2233 | $2200 | $2167 | $2134 | $2102 | $2113 | $2123 | $2134 |
| | | | | | | | | | | 610 |

1 Bedroom (General) ▷

620 Rent ⓘ
$1,400
$1,200
$1,000
$800
$600

MyCo   This Week   Competitors

622 Market Strength ⓘ

FIG. 6A

Table for values to show

| [Value inside Dial] | [Update field] |
|---|---|
| 85% | 8.5% |
| 90% | 4.5% |
| 93% | 4.0% |
| 95% | 3.2% |
| 99% | 2.0% |

| DASHBOARD | RENT OPTIMIZER | YOUR PORTFOLIO | MARKET INTELLIGENCE | RENTER INTELLIGENCE | REPORTS |

1600

| 1 Bedroom ▽ | | | All | | Dallas (TX) | | |
|---|---|---|---|---|---|---|---|
| | | Units | | | Rents ($) | | |
| Portfolio/Property | Occupancy(%) | Available | Leased last week | Current | Competitive | Recommended | Accept |
| Dallas (TX) | 85 | 47 | 12 | $1,295 | $1,510 | $1,334 | ☐ |
| SOMA(CA) | 77 | 20 | 4 | $1,290 | $1,340 | $1,390 | ☐ |
| London(UK) | 87 | 80 | 12 | $1,210 | $1,140 | $1,190 | ☐ |
| Lincoln Park(IL) | 93 | 70 | 31 | $990 | $1,040 | $1,100 | ☐ |
| Flatbush(NY) | 99 | 2 | 44 | $810 | $990 | $1,190 | ☐ |

[ Save ]  [ Undo ]  [ Post ]

FIG. 16

GENERATING RENTAL RATES IN A REAL ESTATE MANAGEMENT SYSTEM

RELATED APPLICATION

This application claims the priority of U.S. Provisional Patent Application No. 62/786,249 entitled "Generating Rental Rates in a Real Estate Management System," filed Dec. 28, 2018, which is incorporated herein by reference in entirety and for any/all purpose.

FIELD

This disclosure relates generally to systems and methods for estimating rental rate in a real estate management system. Examples of optimising rental rate and predicting the time on the market of a rental property are provided.

BACKGROUND

Landlords and other property managers typically set a rental price for a particular rental unit (e.g., apartment, house, townhome, condo, etc.) to maximise the income from the unit, taking into account costs related to the property and expected financial return. Setting the price too high may result in a longer time to rent, and consequently lower than expected occupancy of the property that may have a direct loss in revenue for the landlord. Setting the price too low may result in a lower profit for the landlord or possibly may not cover all the associated costs (e.g., mortgage, upkeep, etc. for the property) or meet the expected financial return for the investor(s) of the property. Current methods to determining rental rates or pricing are generally based on human judgement rather than scientific approaches. Often a landlord relies on a real estate agent's knowledge of the market to set the rent of a property. However these techniques import possible bias by the agent and only taken into account small sub-samples of nearby properties with similar characteristics. Further, generally a real estate leasing agent may have an interest in increasing the rent unnecessarily as many agents are paid via commission based on rent.

Other related techniques for determining property values include those from the hotel industry, in which a "Toy Model" may be used to dynamically set the rate of hotel rooms. These systems, however, typically assume a monopolistic environment, different attributes of apartments, condos, single family rentals and do not take into consideration competitor pricing and other external characteristics. Further, these types of systems typically require a forecast for demand and an estimation for elasticity of price, which are difficult to obtain. Such constraints create a technical problem in that the machine generated pricing may be far from being optimal.

BRIEF DESCRIPTION OF THE DRAWINGS

The present disclosure will be described with reference to the following figures, in which like numerals represent like items throughout the figures.

FIG. 6A illustrates example results of simulations of 1-bedroom apartments in accordance with various examples described herein.

FIGS. 16-21 illustrate various examples implementing one or more embodiments described in the present disclosure.

DETAILED DESCRIPTION

Figure 1A:
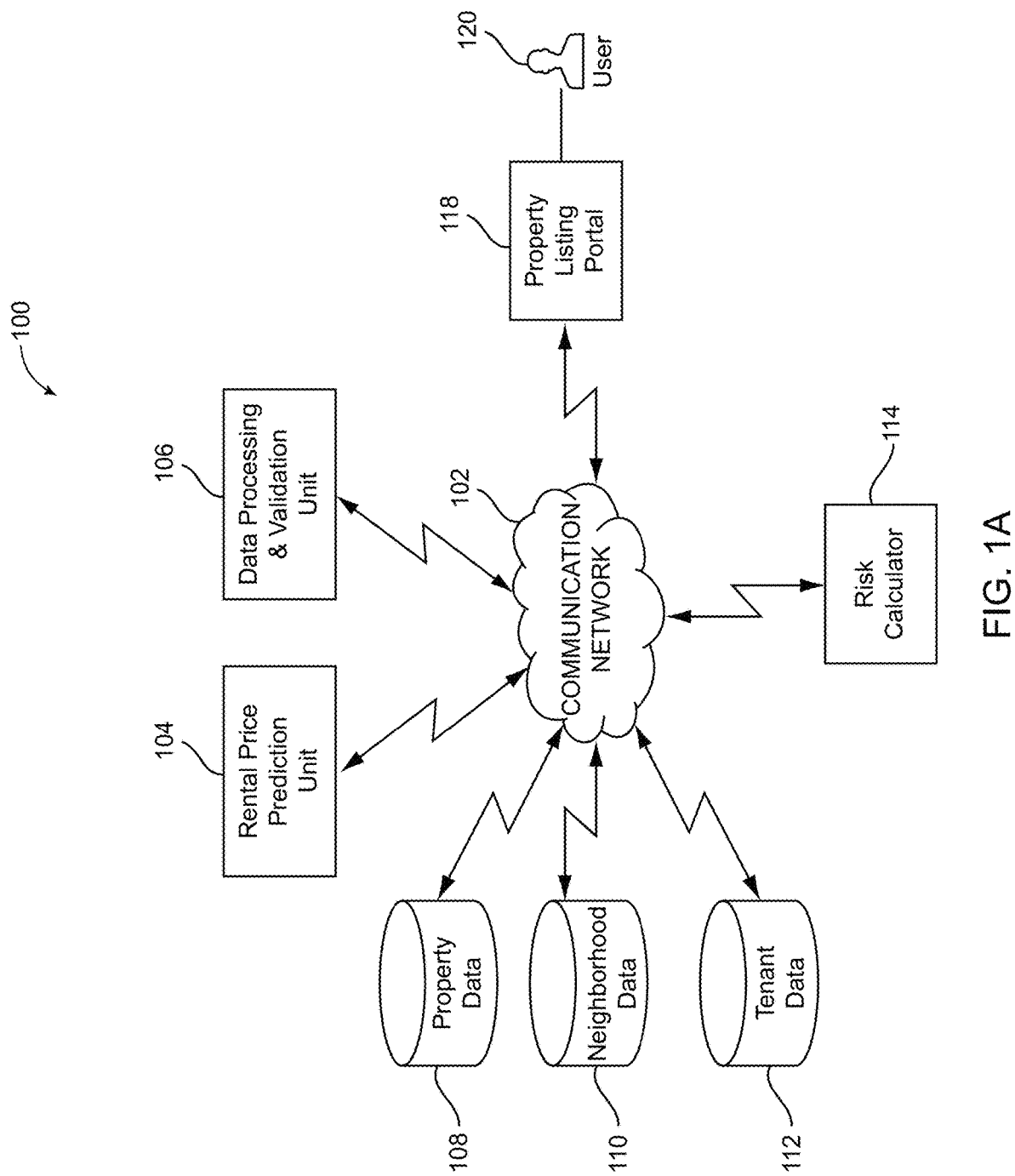
FIG. 1A illustrates an example system for estimating rental prices over a time period in accordance with various examples described herein.

Generally, the present disclosure is related to systems and methods to predict rental price in a real estate management system and modify the expected price based on an expected level of occupancy in a scientific, accurate way with limited bias. The methods described herein may be implemented in various computing devices, such as servers, computers, distributed systems, or the like, and are configured to provide output information in the form of a graphical display, print out, alerts, or the like, to a user, e.g., as an application program interface for a user device. In some embodiments, the method for predicting the rental price takes into account the rental property inventory or availability and market information, and generate a suggested rental price for one or more available rental properties in the inventory. The method for predicting the rental price may dynamically adjust the rental price based on the availability of the system and actual rental price for the units that turned into a sale. The rental price may generally reflect the determined market value for the property, while also taking into account user based risk characteristics or the like.

The rental price prediction and management method may use various machine learning algorithms, such as dynamic programming model, to determine the suggested rental price. The system may further extract features from the rental property listing data and fit a mathematical model, such as random forest model, over the extracted features. The system may use the mathematical model to estimate a time to delist (e.g., the time to rent) for a rental property at a given price. By extracting property features and optionally apply external data to the various models, precise rental values can be produced, where the values may be individualized to the specific unit or other property, providing an intelligent and unique value for each unit, which was not possible with conventional ad-hoc and inaccurate rental value determination methods.

The rental price prediction method may be implemented in multiple applications. For example, the rental prediction method may be applied to a multi-family apartment property management system. The method may also be applied to a storage property management system. These methods and systems allow a user, such as a leasing agent, to be provided predictions on the price or expected number of requests for a select unit or other property item. By generating the predicted rental price and/or expected number of requests for a rental property, the system and method may allow the user to maximise the rental revenue and/or make informed decisions about setting a rental price, which is not possible with the conventional models.

In some examples, the system may communicate with a property listing portal to facilitate interactions with a user to receive information from the user and send prediction results to the user. The system may also receive information about the user's choice of price or updated inventory through the property listing portal and use this information to dynamically adjust the prediction results. For example, in some instances, the system may output a rate card reflecting possible ranges or a particular value for a select unit or a group of units. This output can then be used by a landlord, property manager, or other user to set the pricing for one or more units.

With reference to FIG. 1A, a system for estimating the rental rate and/or delist time in a real estate management system, e.g., system 100, may include various data in a communication system. For example, the data may include property data 108, neighborhood data 110, tenant data 112, and the like. For example, property data may include data specific to the property, including the property itself and apartment attributes, such as the type of apartment (e.g., 1-bedroom or 2-bedroom), parking and amenities. The property data may also include the rental activities of the real estate in the past. Neighborhood data may include data about the neighborhood, such as school, crime rate, median income etc. The neighborhood data may also include the rental prices of competitive managements. Tenant data may include data about the tenant, such as desired date of rental and desired price range.

The system 100 may also include rental price prediction unit 104 configured to predict the rental price for a given capacity of the rental place based on the various data 108, 110 and 112. The system 100 may also include data processing and validation unit 106. For example, data processing and validation unit may retrieve at least a portion of the data 108, 110 and 112, validate the retrieved data and/or process the data to extract certain features. The system 100 may further include risk calculator 114. In a non-limiting example, the risk calculator may evaluate the predicted rental price by considering the suggested rental price may likely result in a rental in light of the competitive rental prices in the neighborhood, calibrate expected profit potential and loss through vacancy, and/or the tenant's rental profile. For example, if the suggested rental price is significantly higher, the risk calculator may generate an output that so indicates, and also outputs the expected occupancy at the suggested numbers. If the suggested rental price is higher than the historic rental price that the tenant had paid in the tenant's rental history, then the risk calculator may also generate an output that so indicates. This helps a landlord, property manager, or other user to understand possible risk associated with a selected rental value or rental price.

The system 100 may also include a property listing portal 118. For example, the property listing portal may be configured to interact with an administrative user 120 or other user, and generate an estimate of rental price given the available rental units or inventory. In a non-limiting example, the property listing portal 118 may receive the user's input, and transmit the user information to the rental price prediction unit 104. The property listing portal 118 may also receive the output from the rental price prediction unit 104 and display the result to the user. For example, the result may include a price card that includes suggested rental prices of each available property over a span of several weeks. In other words, the rental price prediction unit may generate a suggested rental price for a unit that varies by day or by week. In a non-limiting example, the property listing portal 118 may also display to the user an estimated delist time for a given price.

In a non-limiting example, the rental unit allocation portal 118 may be a website portal installed on a server on the communication network 102. The portal 118 may include a back-end database engine configured to retrieve data from the communication work, such as property data 108, neighborhood data 110 and tenant data 112. In some examples, the portal 118 may include a user interface, such as a website page displayable on a display of a user device. In some examples, a portal may include a processing device and an application executable on the processing device. The application may have a user interface. The user interface of the portal 108 may facilitate a user, e.g., a leasing agent, to interact with the portal 118. For example, the user may enter tenant (or prospective tenant) information, application data, intended stay, rental history, and desired price range etc. In some examples, some of those information may be obtained through a database engine, which may be configured to use user entered information to interrogate the various data available on the communication work 102 and retrieve other related information. For example, the portal 118 may receive the demographic information from U.S. Census data, or retrieve rental prices of the neighborhood from multiple listing services or internet listing services. such as Zillow, or other databases alike.

Various aforementioned units and system may be configured to communicate with each other via the communication network 102. The communication network 102 may be operating using wired (e.g., Ethernet) or wireless communication protocols (e.g., Wi-Fi, Bluetooth), or other communication protocols now or later developed.

In some examples, the property listing portal 118 may be triggered by the user 120 and cause the rental price prediction unit 104 to determine the suggested rental price for a given property or all of the available properties of the property management system. The system may also cause the risk calculator 114 to determine the risk associated with the estimated rental priced produced by the rental price prediction unit 104. For example, the risk may include a potential risk of no rental or a length time to delist due to high price. Based on the result of the suggested rental price, the system may cause the property listing portal 118 to list the suggested rental price, such as via a price card. The property listing portal 118 may also facilitate interaction with the user, via the user interface, to allow the user to override the suggested price.

Figure 1B:
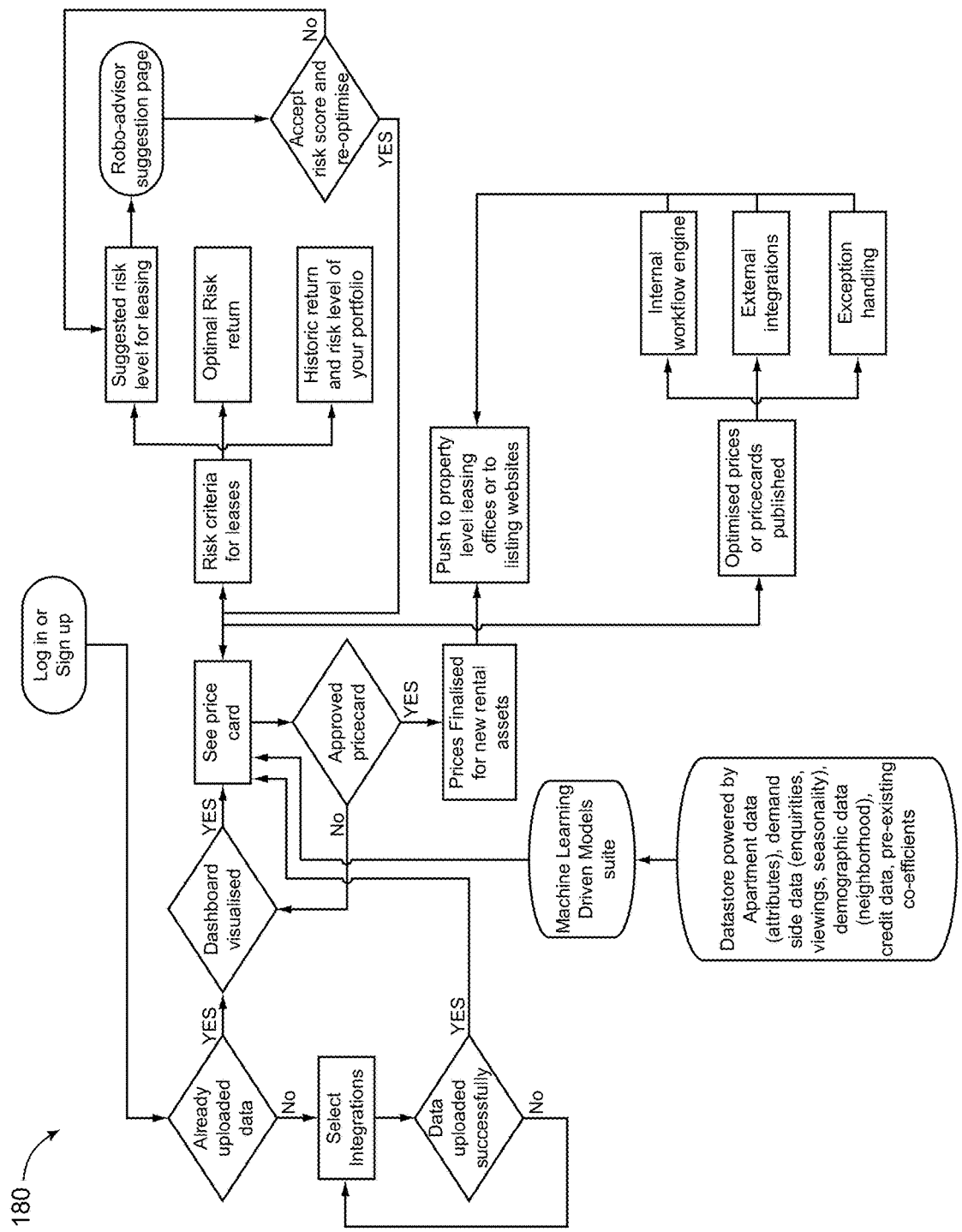
FIG. 1B illustrates a diagram of an example process implemented in the system of FIG. 1A in accordance with various examples described herein.

FIG. 1B further illustrates an example process that may be implemented in a system, such as FIG. 1A. The examples illustrated in FIGS. 1A and 1B may also be implemented in various applications, such as apartment rentals and storage rentals.

Figure 1C:
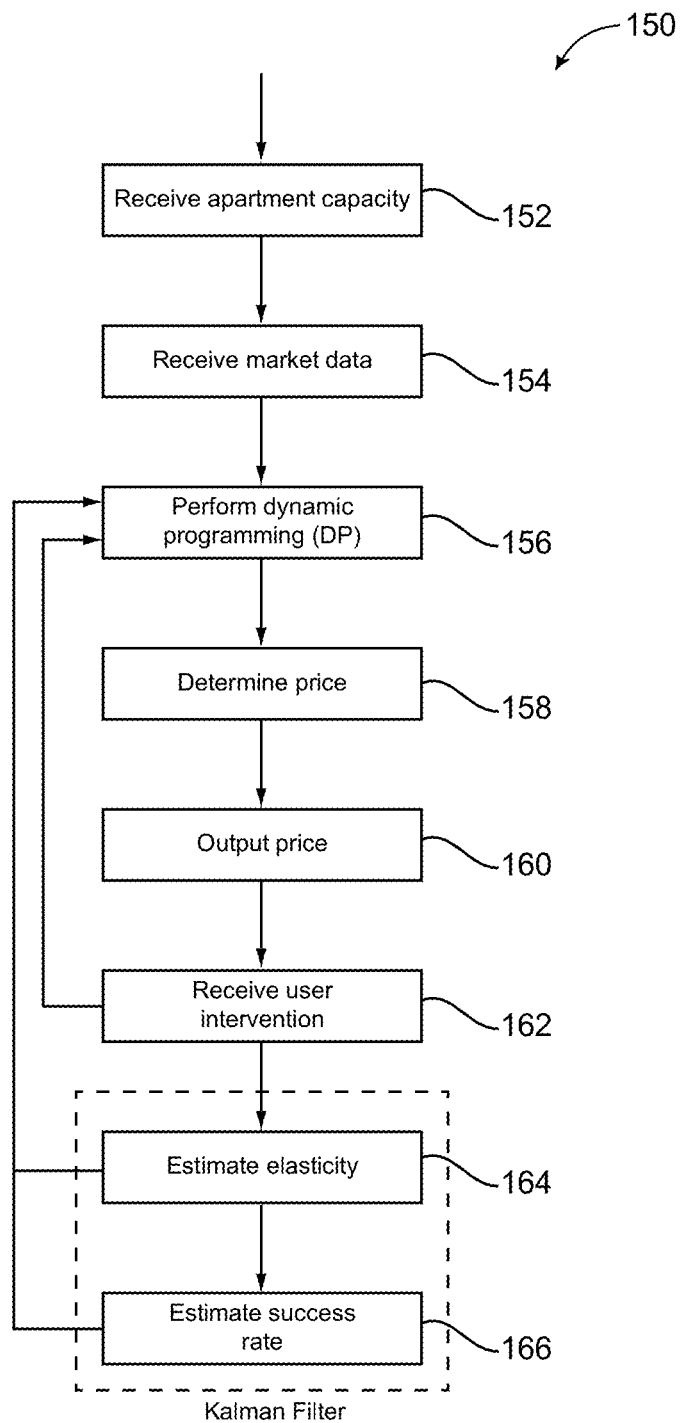
FIG. 1C illustrates a diagram of an example process of determining rental prices of multi-family apartments in accordance with various examples described herein.

With reference to FIG. 1C, a process of determining rental price for multi-family apartments are described. A process, such as 150, may be implemented in the system 100 in FIG. 1A. The process 150 may include receiving the apartment capacity data at 152 and retrieving other data at 154. For example, process 152 may receive tenant application data and/or apartment availability information from the property listing rental portal (e.g., 118 in FIG. 1A) via the communication network 102. Process 154 may also retrieve other types of data (e.g., 108, 110, 112 in FIG. 1A) via the communication network 102 or via a direct connection, such as accessing data from one or more memory locations or other storage. Process 150 may further include performing machine learning tasks, such as constrained optimisation methods including dynamic programming (DP) at 156. The constrained optimisation method will be further explained in detail. The box 156 will use the various data (e.g., 108, 110, 112 in FIG. 1A) or administrator or tenant provided data and determine an estimated rental price at 158. The process 150 will output the estimated rental price at 160. For example, the process 150 may transmit the estimated rental price to the property listing portal (e.g., 118 in FIG. 1A) so that the property listing portal 118 may display the result to the user.

In some examples, the constrained optimisation approach using dynamic programming in process 156 includes multiple iterations, at each of which the process may adjust by finding the optimal path to maximise the object function and by taking into consideration the parameter changes. For example, as some apartment units are rented out or some apartment units become available and added to the inventory, the process 156 may produce the estimated rental price accordingly. In a non-limiting example, the process 150 may also include receiving user intervention on the suggested rental price at 162. For example, an administrative user 120 (in FIG. 1A) may override the suggested rental price, consequently box 156 may receive the new price that is selected by the user and use that information for future iterations.

In some examples, the dynamic programming in box 156 may further use price elasticity and success rate in the modelling. In a non-limiting example, the process 150 may include estimating price elasticity at 164. The process 150 may also include estimating success rate parameters at 166. In some examples, processes 164 and 166 may be implemented by using a Kalman filter. This is further described in detail.

In a multi-family apartment rental application, for example, a building's portfolio may include 1 and 2 bedroom apartments. These two types of property may be treated as individual asset classes. It is also assumed that these can be modelled separately and are effectively independent from each other, as they are marketed for different clusters of tenants. In some examples, an optimisation method may treat the apartments as homogeneous, and the desired outcome is a single optimal rent for each asset class. This mostly holds for a microeconomic perspective. However, there may be some macroeconomic correlation in the long run.

In some examples, within each asset class, there are some slight differences in their pricing based on apartment size, floor height and window direction. A pricing adjustment may be used for those features can be made on top of the optimal rent. In some scenarios, in a non-limiting example, a linear model could be fitted on the properties with the current asking rent as the response and the described features as the explanatory variables. The model coefficients can then help form the necessary pricing adjustments.

A constrained optimisation approach is further described with adaptation of a hotel pricing model to a multi-family apartment blocks. Suppose the property manager has $C_i$ vacant apartments of asset class i and they wish to maximise revenue by setting them at the optimal rent. This is essentially solving a constrained optimisation problem, where the price is the control. The formulation for each asset class i is:

$$\max_{p_i} \quad p_i d_i(p_i) \quad i \in \{1, 2\}$$
$$\text{s.t.} \quad d_i(p_i) \leq C_i$$
$$p_i \geq 0.$$

$p_i$=price of asset class i
$d_i(p_i)$=number of units of asset class i demanded at price $p_i$
$C_i$=capacity i. e. current number of vacant units of asset class i Under this framework the next step is to define a relationship between $d_i$ and $p_i$. A natural assumption is that leasing property follows the law of demand, under which, if the price of a good increases then the quantity demanded decreases. Conversely, as the price of a good decreases, the quantity demanded increases. This leads to the following assumption, which serves as the demand function for class i:

$$d_i(p_i) = \ddot{d}_i \left(\frac{p_i}{\ddot{p}_i}\right)^e, \text{ with } e \in (0, -\infty). \quad (2.1)$$

where:
$\ddot{p}_i$=nominal price for asset class i
$\ddot{d}_i$=nominal demand for asset class i
e=price elasticity of demand Here, a double dot notation is used to denote the nominal version of a variable. The nominal demand is the demand in number of units at the nominal price. This acts as a base point for the demand-price relationship. In some examples, the elasticity may be assumed to be asset class independent.

The inversion of (2.1) provides the price that is expected to achieve a certain level of demand. The price function is:

$$p_i(d_i) = \ddot{p}_i \left(\frac{d_i}{\ddot{d}_i}\right)^{\frac{1}{e}}. \quad (2.2)$$

The inclusion of these extra parameters: $\ddot{p}_i$, $\ddot{d}_i$ and e creates a need for further assumptions. For example, in real estate, the median rent for a group of similar properties is a commonly used statistic. This is due to its robustness to outliers. It shall therefore be the estimation for nominal price. Let the nominal price $\ddot{p}_i$ be estimated as the median rent of the occupied properties in the portfolio.

$$\hat{\ddot{p}}_i = \text{median}(R_i)$$

$$R_i := \left\{ r_i^k \mathbb{1}_{r_i^k > 0} : r_i^k \text{ is the rent revenue of the } k^{th} \text{ property of asset class } i \right\}$$

The corresponding nominal demand also requires an assumption. For example, one idea was to base it on the landlord's monthly performance to lease property. Another example may be to use a market oriented assumption. For example, the market data says that the London-wide occupancy rate O is 96%. Let's suppose this 96% acts as an equilibrium point to which all property portfolio occupancy rates converge to. With this idea. the nominal demand $\ddot{d}$ i is such that $$\frac{\ddot{d}_i + r_i}{C_i} = O \text{ is satisfied.} \quad (2.3)$$

where:
$r_i$=number of class i properties currently occupied in the portfolio
$C_i$=total number of class i properties in the portfolio
O=London-wide occupancy rate, such as, for example, 0.96

Then $d_i$ becomes:

$$\ddot{d}_i = OC_i - r_i.$$

Figure 2A:
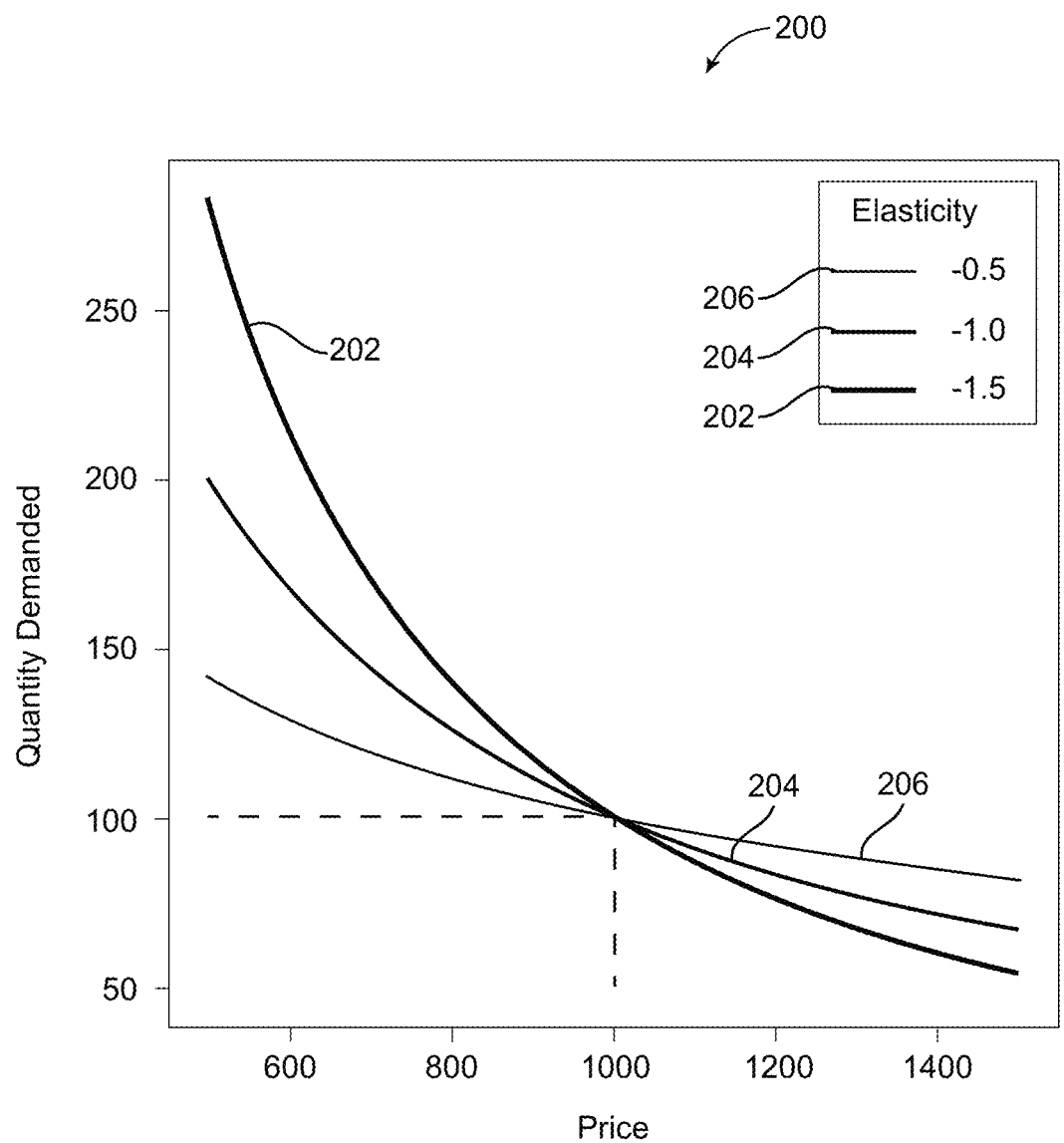
FIG. 2A illustrates an example of price elasticity of demand curves in accordance with various examples described herein.
Figure 2B:
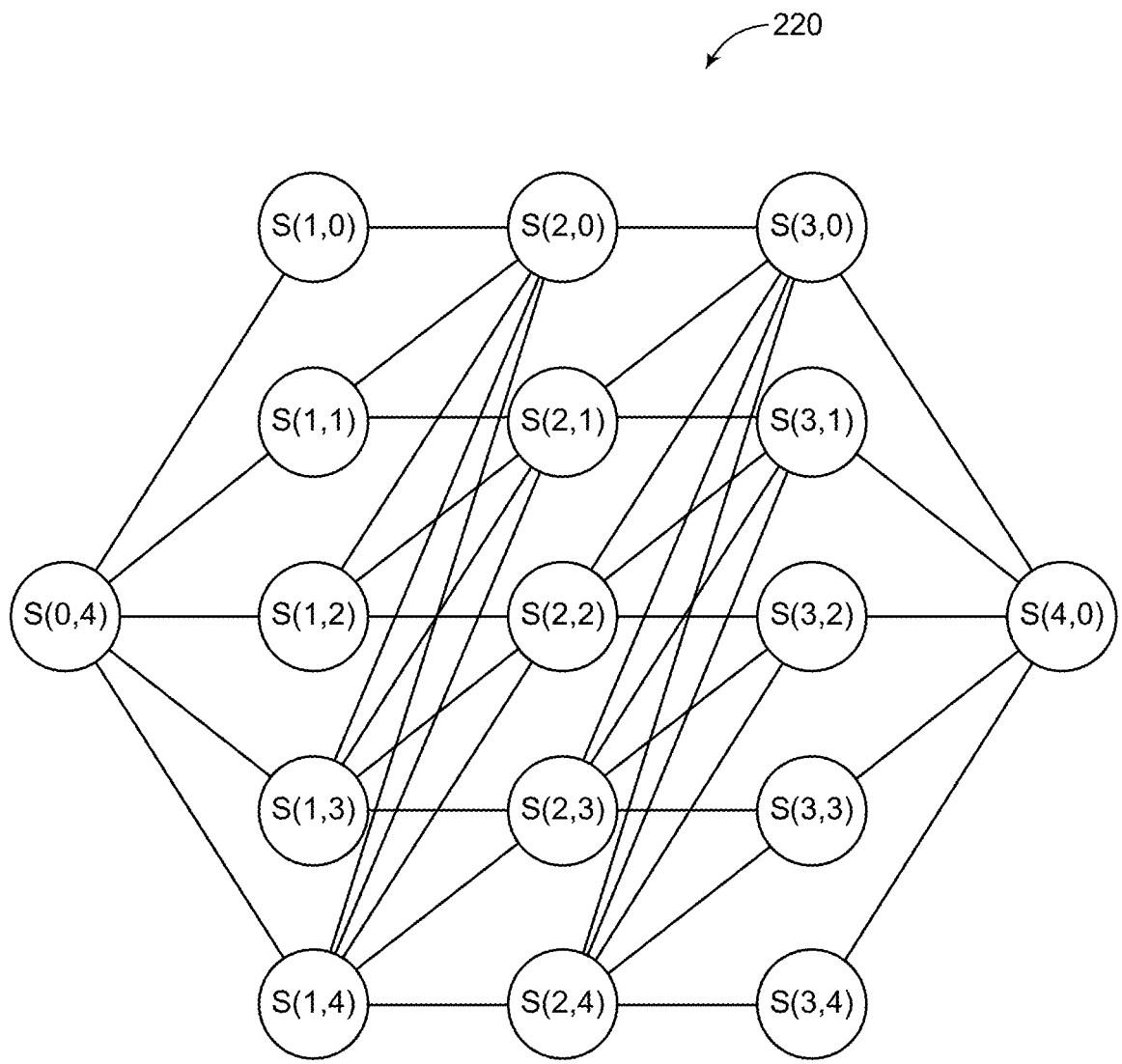
FIG. 2B: illustrates an example of state space in accordance with various examples described herein.
Figure 3:
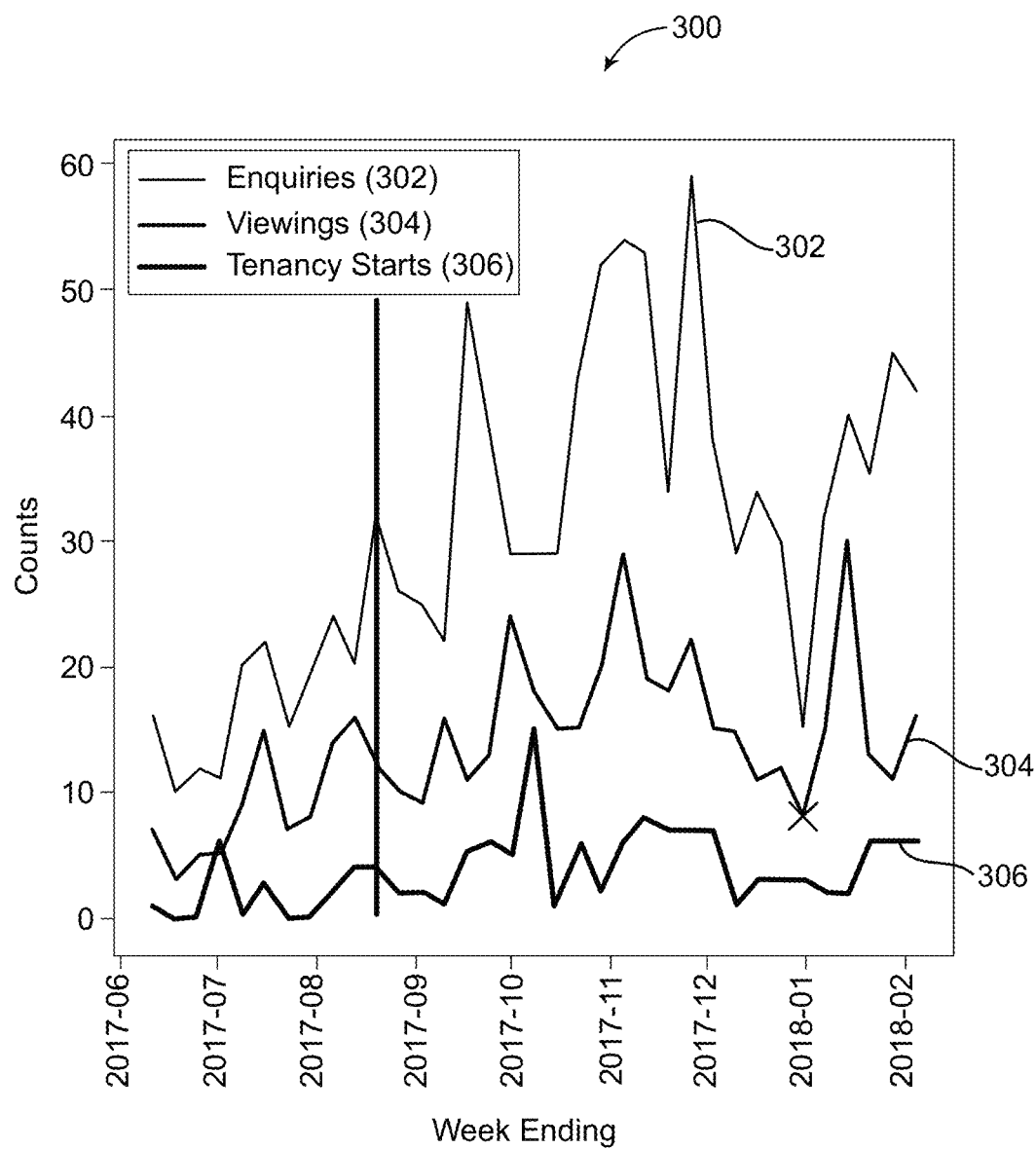
FIG. 3 illustrates examples of user enquiry data in accordance with various examples described herein.

Price elasticity of demand measures how responsive the market is to changes in price for a particular good. For leasing real estate, it is difficult to estimate. There is simply no readily available data that observes how the market reacts to price changes. FIG. 2B shows the effect of elasticity on the price-demand relationship, with $\ddot{d}_i$=100 and $\ddot{p}_i$=1000.

The blue line represents an inelastic curve. The green line is an elastic curve. And the orange line demonstrates the relationship with an elasticity of −1. The choice of elasticity has a fundamental impact on the optimal solution as described in the following lemma.

Assume $d_i \in \mathbb{N}$, then the following three cases of elasticity yields a particular optimal solution.
if e=−1, then a unique solution does not exist.
if e∈(−∞, −1) i.e. elastic, then the solution will be such that the capacity constraint maximized ($d_i=C_i$). And the price will be $$\ddot{p}_i \left(\frac{C_i}{\ddot{d}_i}\right)^{\frac{1}{e}}$$

if e ∈(−1, 0) i.e. inelastic, then the solution will be such that $d_i$=1 and $$p_i = \ddot{p}_i \ddot{d}_i^{-\frac{1}{e}}$$

In some examples, some limits may be imposed on the effect of elasticity. For example, inelastic case motivates the use of an upper bound price constraint, namely $p_i \leq P_i$ where $P_i \in \mathbb{R}_+$. Although under $d_i \in \mathbb{R}$, this constraint will simply make $P_i$ the optimal price.

The following table provides an overview of the dataset the above model relies on.

TABLE 1

Constrained optimisation data schema

| Attribute Name | Description | Type |
| --- | --- | --- |
| ID | Property unique identifier | numeric |
| Bedroom | Number of bedrooms | numeric |
| Monthly Price | Achieved monthly rent | numeric |

In some examples, dynamical programming may be used. Dynamical programming is an optimisation method. The general idea is to break down a problem into a sequence of sub-problems. For a discrete finite time horizon, this can be implemented using the Bellman equation and backward induction. The typical set up for a dynamic decision problem with such a time horizon and a discounting factor is:

$$V(x_0) = \max_{\{a_t\}_{t=0}^N} \sum_{t=0}^N \beta^t F(x_t, a_t),$$

$$\text{s.t.} \quad a_t \in \Gamma(x_t).$$

$$x_{t+1} = T(x_t, a_t),$$

$$\text{for all } t = 0, 1, 2, \ldots, N.$$

where:
V(x)=Objective function to be maximised
F(x, α)=Payoff from taking action a in state x
Γ(x)=Set of possible actions a that can be taken at state x
T(x, α)=The new state that x has transitioned to by action a
β=Discount factor parameter The Bellman equation is derived through Bellman's principle of optimality. Through this principle the first n decisions can be separated from the remaining like so:

$$V(x_n) = \max_{\{a_t\}_{t=n}^{N}} [\beta^n F(x_n, a_n) + V(x_{n+1})].$$

Suppose the manager has C vacant apartments that are homogeneous. And they wish to reach a target occupancy by a certain date. For simplicity, let's also assume that occupied properties in the portfolio cannot become vacant (tenancy termination) during this time horizon. From this point onwards, the target occupancy is 100% and the deadline is in T weeks. So the optimisation will be:

$$\max_{\{p_t\}_{t=0}^{T-1}} \sum_{t=0}^{T-1} (1-\beta t)p_t d_t(p_t),$$

$$\text{s.t.} \sum_{t=0}^{T-1} d_t(p_t) \leq C,$$

$$p_t \geq 0.$$

where
- β=discount factor parameter to penalise vacancy
- $p_t$=asking price of an apartment at week t
- $d_t(p_t)$=number of apartments demanded between week t and t+1
- C=total capacity at week 0

In a typical Bellman equation, the discounting would usually take the form of: $\beta^t$. This will normally apply to situations involving interest rates like maximising a utility function, where the wealth has some compounding characteristic. The discount factor β is used to encourage more leases at the start of the selling period. In a non-limiting example, the discount factor β may be set to 1/52. This is equivalent to losing t weeks worth of rent at price $p_t$. If the objective function is defined as average monthly revenue over the next 12 months, then T may be set to be less than 1/β in order to ensure positive discounted revenue.

In this framework, the number of weekly enquires or viewings is a proxy for demand. This is assumed to be time dependent by seasonality. Furthermore, it is assumed to be price dependent because a potential tenant can see the asking price before making a request. In some examples, the number of weekly requests $r_t$ at week t, follows an inhomogeneous Poisson process with intensity parameter $\lambda(t, p_t)$. And the demand follows a Binomial distribution, with n trials and success probability s which is to be estimated. This formulation is:

$$d_t \sim Bin(r_t, s), \quad s \in (0, 1),$$

$$r_t \sim Poi(\lambda(t, p)),$$

$$\lambda(t, p) = \bar{r}\left(\frac{p}{\bar{p}}\right)^e, \quad e \in (-\infty, 0).$$

where:
- s=success rate parameter, i.e. the probability a request becomes a tenancy
- $\bar{p}$=nominal price
- $\bar{r}$=nominal requests
- e=price elasticity of requests The success rate parameter can be estimated from the historical enquiry data. The nominal requests process is already time and price variant. In some examples, s may be constant and not dependent on other variables.

In some examples, the rent optimisation problem is very well suited to stochastic dynamical programming as it can be divided into finding the optimal rent on a weekly basis. Plus it is already established as a discrete time setting in a finite time horizon. In this framework the price choices are the actions, the payoffs are the discounted revenue from newly leased apartments and the time-capacity positions become the state space. The Bellman equation in this scenario is therefore:

$$J(c_t) = \max_{p_t} \mathbb{E}_t[(1-\beta t)d_t p_t + J(c_{t+1})],$$

where J is the objective function and $c_t$ is the capacity at time t.

The initial step of the recursion at time T−1 will optimise:

$$J(c_{T-1}) = \max_{p_{T-1}} \mathbb{E}_t[(1-\beta(T-1))c_{T-1}p_{T-1}].$$

Then the next step will optimise:

$$J(c_{T-2}) = \max_{p_{T-2}} \mathbb{E}_t[(1-\beta(T-2))(c_{T-2}-c_{T-1})p_{T-2} + J(c_{T-1})].$$

This repeats recursively until time 0.

The dynamical programming requires a function $T(c_t, p_t)$ that establishes the transitions between states for taking a certain action $p_t$. In this framework the transition function will be:

$$c_{t+1} = c_t - \mathbb{E}[d_t(p_t)].$$

The function for expected demand given a pricing action is provided below $$\mathbb{E}[d_t(p_t)] = s\bar{r}\left(\frac{p_t}{\bar{p}}\right)^e. \quad (3.1)$$

The state space S is defined by the property portfolio position with a 2-tuple S(t, c), where t is the week and c is the capacity. The initial state is S(0, M) represents the portfolio at the start of the selling period with full capacity. And the terminal state S(T, 0) corresponds to the desired end goal of 100% occupancy at time T. At each state, the property manager can make a pricing decision which dictates the state the portfolio will be in the next time step. As a result of the assumption stated earlier that properties cannot become vacant: the capacity cannot increase over time.

In an example, such as FIG. 2B, an example state space is shown for T=4 and C=4. As shown in FIG. 2B, the algorithm finds the optimal path from each state to the terminal node. Starting with the nodes in time T−1, it computes the price that is expected to achieve the desired demand to go from the state's capacity to zero. This price action is obtained by inverting equation-(3.1). Then for states in the next preceding time step, it calculates the Bellman equation for each possible path and picks the optimal one.

In some examples, proper features are used for the dynamical programming model described herein. Due to data limitations, the nominal requests $\ddot{r}_t$ is assumed to be constant over time. This in fact simplifies the problem to a one dimensional Markov decision process because the price actions are no longer time-dependent. The problem with this estimate is that it represents the combine viewings of 1 and 2 bedroom apartments. In order to split the requests into the two asset classes, it is assumed that they can be broken down by a constant ratio.

The success parameter s can be estimated from the proportion of viewings that become move-ins. A standard approach is to view the data as T weekly observations of the proportion of viewings that become move-ins. Take the mean as the estimator, such as:

$$\hat{s} = \frac{1}{T} \sum_{t=1}^{T} \frac{m_t}{r_t}.$$

$m_t$=move-ins in week t
$r_t$=viewings in week t

Alternatively, an estimation is to divide the total move-ins by the total viewings, such as:

$$\hat{s} = \frac{\sum_{t=1}^{T} m_t}{\sum_{t=1}^{T} r_t}.$$

In implementing the dynamical programming algorithm, in some examples, the estimates of nominal requests and success parameter may be used. In addition, there is still the choice in time horizon length T. To solve this problem, a grid search on T is used to find the optimal time horizon that reaches the 100% occupancy target. It is expected that the objective function should rise with an increase in T because there will be more demand exposure. On the other hand, this increase should slow down due to the heavy discounting on apartments leased near the end of the period. In some scenarios, the results were computed for a range of elasticity values. The two other variables nominal price and capacity remain the same.

Figure 4:
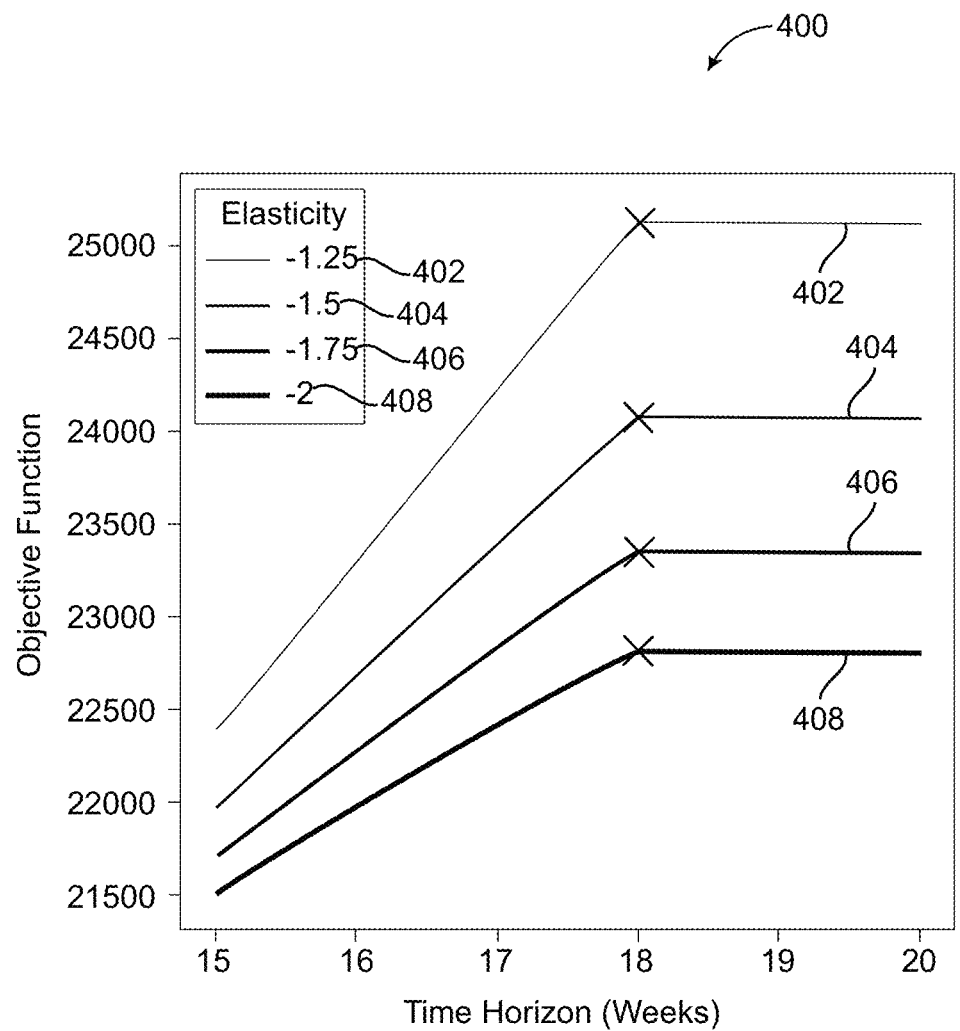
FIG. 4 illustrates examples of grid search of 1-bedroom apartments in accordance with various examples described herein.
Figure 5:
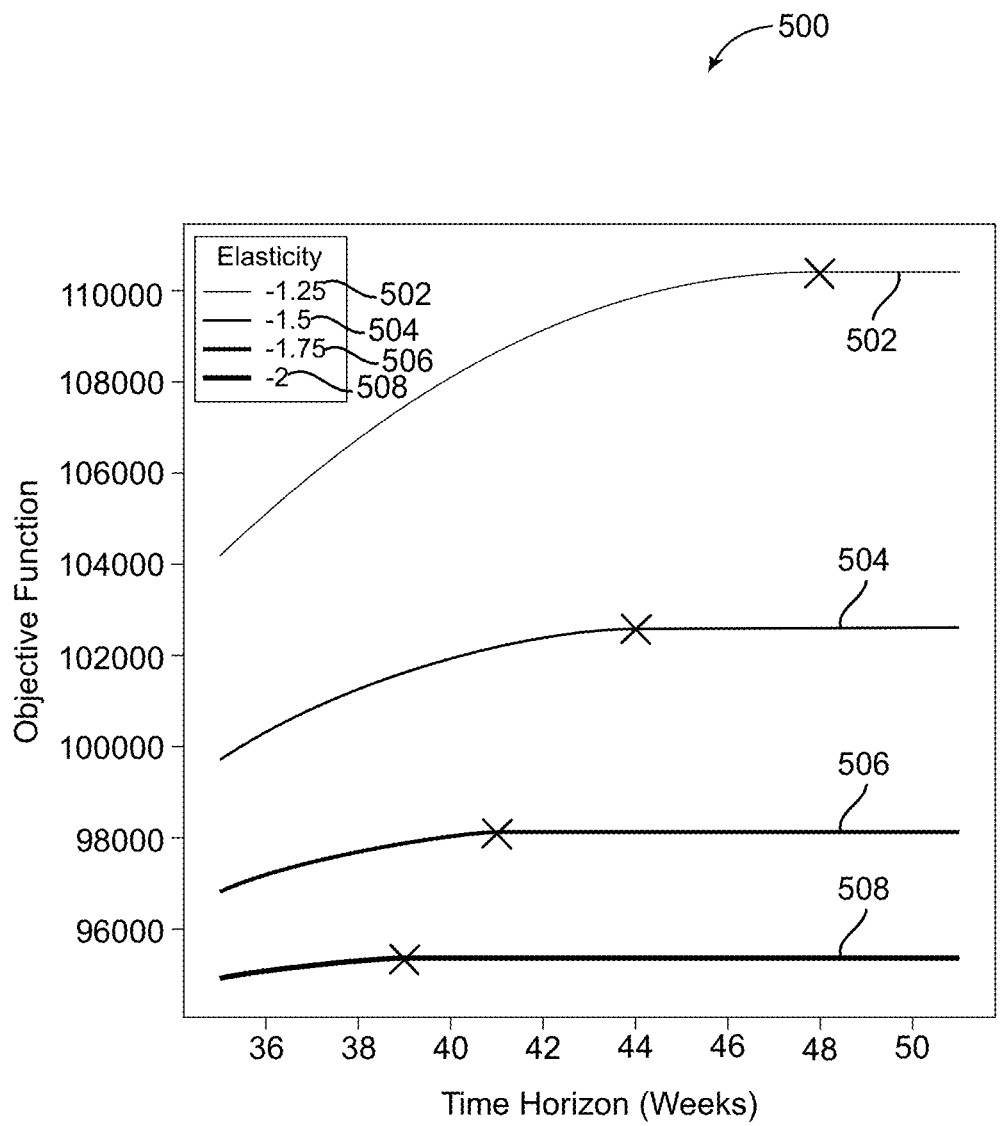
FIG. 5 illustrates examples of grid search of 2-bedroom apartments in accordance with various examples described herein.

FIG. 4 illustrates the results of the grid search for the 1 bedroom apartments. The first observation is that the optimal T is 18 weeks. And it appears to be the optimal T for all elasticity choices. This is unexpected. Although perhaps the optimal T will vary more with an extended list of elasticity values.

The optimal path for each elasticity was to keep prices constant throughout the period. And this is expected to achieve one newly leased apartment every week. This is unfortunate. As it was hoped that the sequence of prices would be more dynamic. The mostly likely causes are the constant nominal demand assumption and a low supply. Under a time-invariant nominal demand, the prices to achieve an expected number of leases will remain the same throughout the period. The low supply means a path can reach 100% occupancy relativity quickly and so may not be heavily affected by discounting. Hence the optimal path is to only sell 1 unit a week.

Figure 6B:
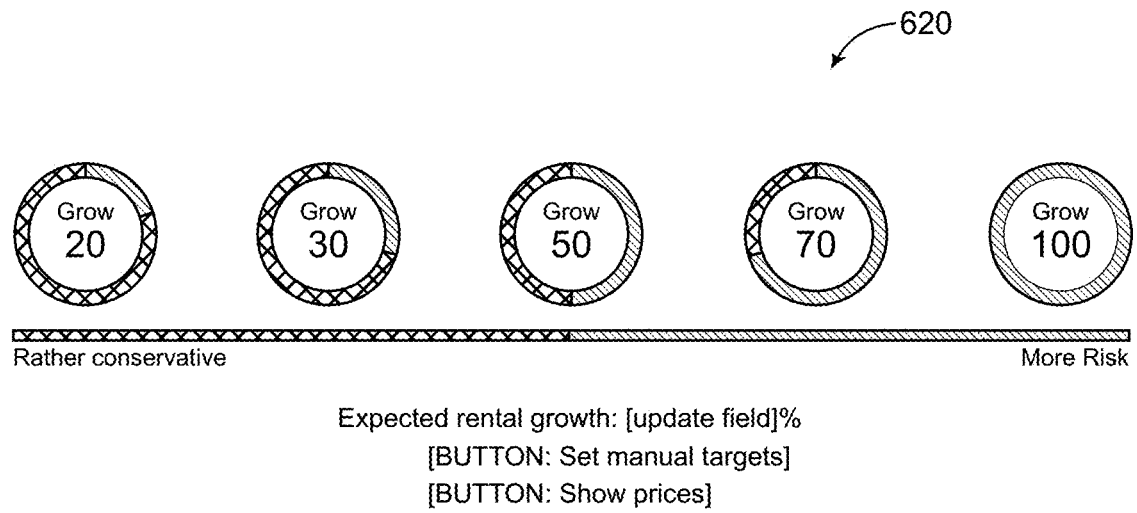
FIG. 6B illustrates an example output of the system to the user in accordance with various examples described herein.

FIG. 6A illustrates a user interface that shows a user interface of a rate card 600. In some examples, rate card may include the result of estimated rental prices 602. In some examples, the estimated rental prices may include a suggested price of an available property unit, where the suggest price may change on a weekly basis. As shown in the rental prices in FIG. 6A, each of the available units may have a suggested rental price for each week. For example, the first property 604 has a suggested price of $1,211 for the week of August 27, and $1,217 for the week of September 3. The next three properties shown in FIG. 6A, e.g., 606, 608, 610 may be of different types of apartments and have difference prices. FIG. 6B illustrates an example output of the system to the user. The user interface shown in FIGS. 6A and 6B may be implemented in the property listing portal 118 in FIG. 1A, or in a process of showing price card as shown in FIG. 1B.

In some examples, the user interface of the rate card 600 may also include the occupancy rate 612 and total number of units rented 614 of the property, such as one-bedroom apartments. The rate card 600 may further include the total monthly income 616 that are translated from the total number of units rented. Optionally, the user interface may allow the user to select a particular rental unit, such as 604. Additionally, the user interface may display the remaining length of stay 618 of the selected property. Additionally, and/or alternatively, the rate card 600 may include market information such as the rental price of the user and the price of the competitors for a period of time, such as a specific week. The rate card 600 may also include a market strength indicator 622, which shows the rental market index.

Figure 7A:
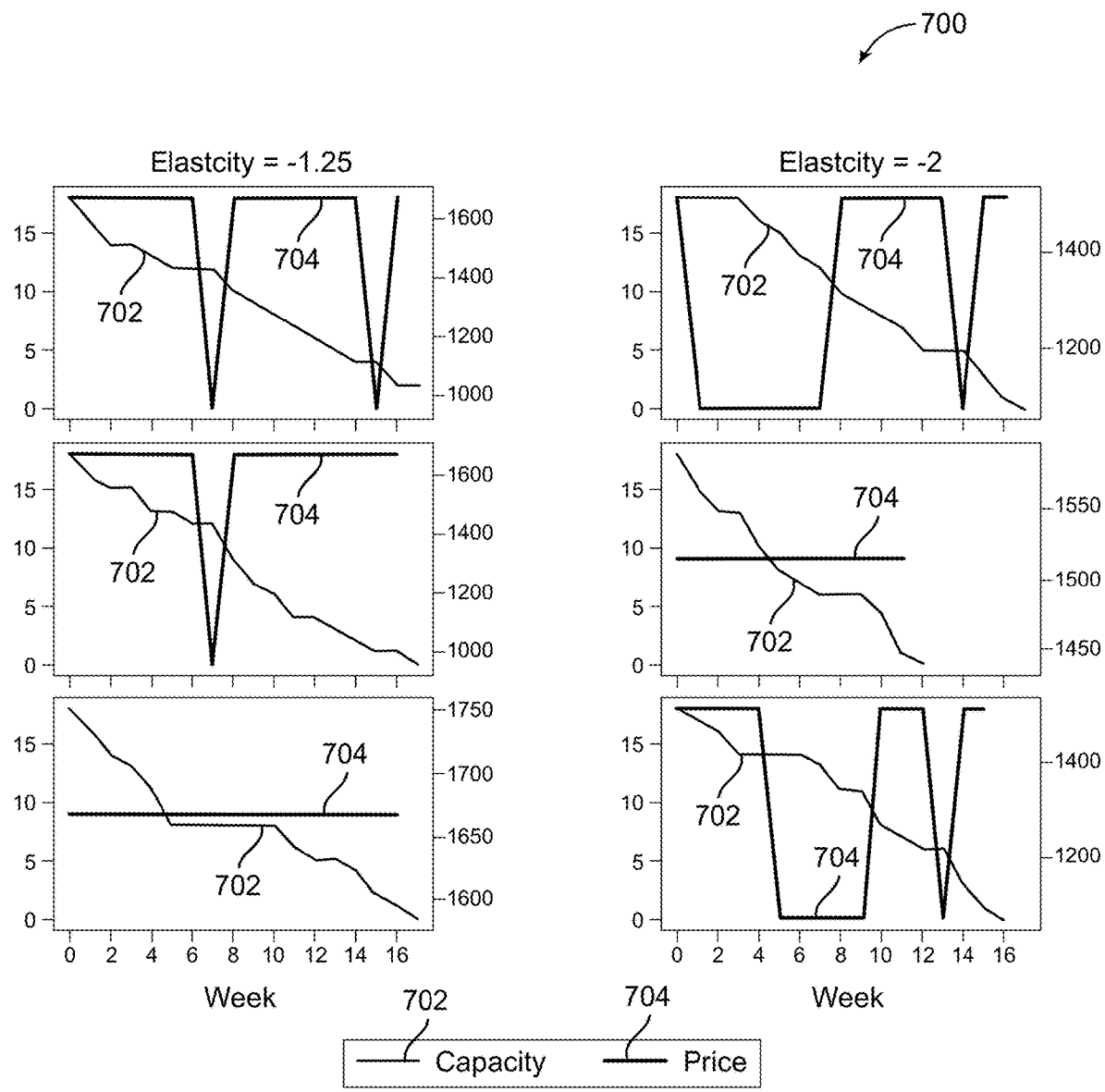
FIG. 7A illustrates example results of simulations of 2-bedroom apartments in accordance with various examples described herein.

To provide an insight into the algorithm's stochastic nature and show how it performs under random events, some simulations are performed and described herein. FIG. 7A shows 3 realisations of 18 week, 1 bedroom optimisations for elasticity values: −1.25 and −2. Each simulation is presented in its own graph, plotting the capacity and price at weekly frequency. They are arranged such that the first column of graphs are realisations with e=−1.25 and the second column is for the case when e=−2. This layout is used throughout the thesis to visualise simulations.

The simulations show a wide variety of pricing decisions. They all appear to be rather rigid: they either stay constant or jump between two different values. The price drops seem to occur after a week of no new leases. This makes intuitive sense because the natural response to slow demand is to reduce prices.

Figure 7B:
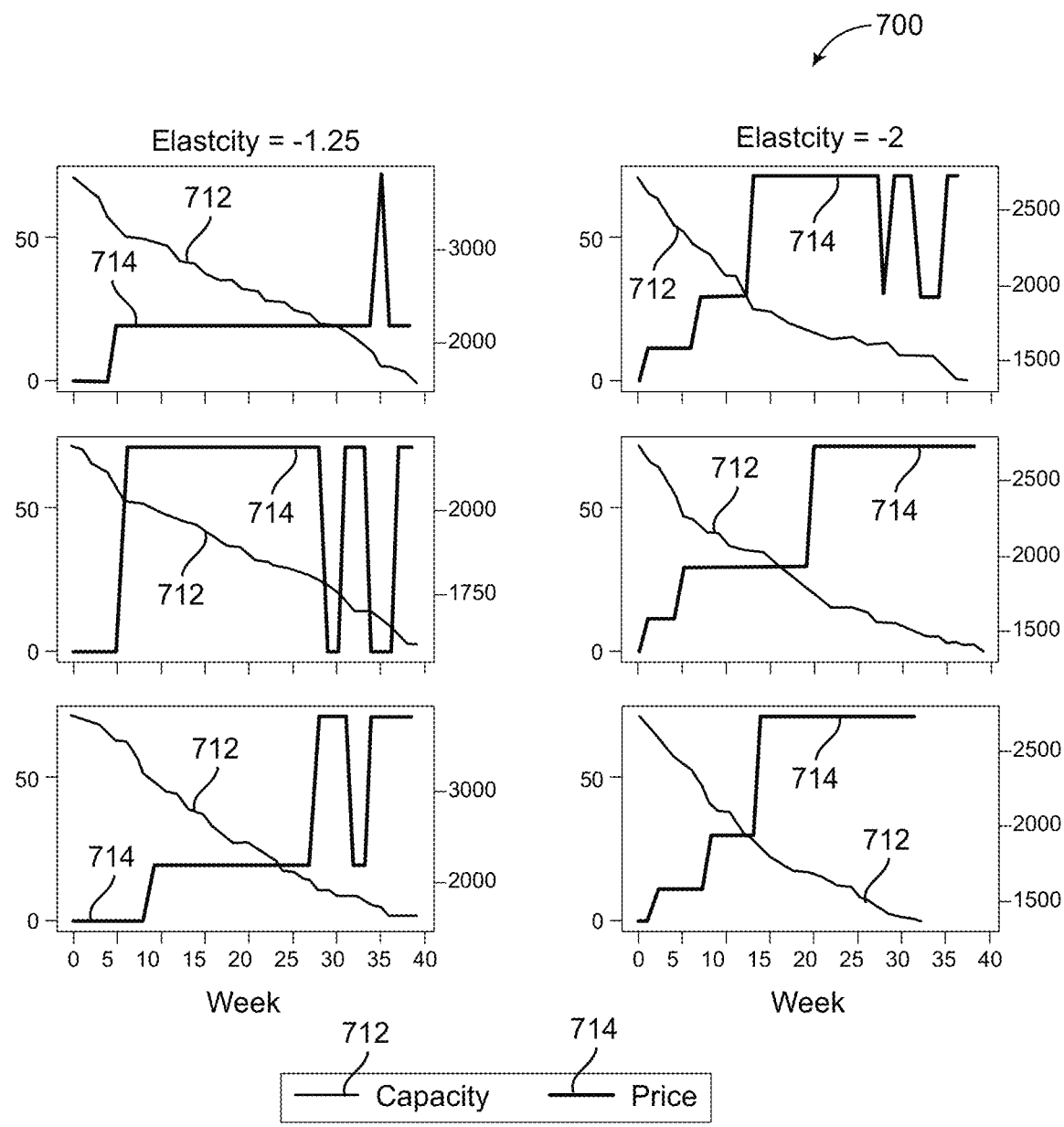
FIG. 7B illustrates example results of simulations of 2-bedroom apartments in accordance with various examples described herein.

FIG. 7B illustrates the simulations for 40 week, 2 bedroom optimisations. As shown, the pricing decisions in these realisations vary much more than the 1 bedroom. Although the pricing is still a bit ridged. But the strategy is at least choosing between more than 2 price levels. The greater variety of paths is likely caused by 2 bedroom having a larger initial capacity and a longer time horizon than 1 bedroom. Overall the simulations show that the pricing strategy is sensitive to random changes in capacity. The ridged pricing is probably a symptom of the constant demand and discrete nature of the model.

In some examples, the Kalman filter may be used. The Kalman filter is an algorithm that can provide estimates of unknown variables through measuring sequential observations of another variable. The standard Kalman filter set up is:

$$x_{k+1} = A_k x_k + b_k + w_{k+1}, \; w_k \sim N(0, Q_k),$$

$$y_k = C_k x_k + d_k + v_k, \; v_k \sim N(0, R_k).$$

where:
    x=unobserved variable
    y=observed variable
    A=transition matrices
    b=transition offsets
    w=transition noise
    Q=transition covariance
    C=observation matrices
    d=observation offsets
    v=observation noise
    R=observation covariance In some examples, it may be assumed that the model is a linear system and the measurement noise is white and Gaussian. The analytical solution may be obtained by performing these two steps: a prediction step and an update step. The prediction step is where $x_k$ and it's error covariance matrix $P_k$ are estimated with the information at time k−1. Their computations are stated in the equations:

Prior unobserved state estimation: $\hat{x}_{k|k-1} = A_k \hat{x}_{k-1|k-1} + b_k$ Prior error covariance: $P_{k|k-1} = A_k P_{k-1|k-1} A_k^T + Q_k$.

In the second step, after observing $y_k$ the algorithm proceeds with the update step where:

Compute observation residual: $\tilde{y}_k = y_k - C_k \hat{x}_{k|k-1} - d_k$

Compute the observation residual covariance:
$S_k = C_k P_{k|k-1} C_k^T + R_k$

Calculate the optimal Kalman Gain: $K_k = P_{k|k-1} C_k^T S_k^{-1}$

Posterior unobserved state: $\hat{x}_{k|k} = \hat{x}_{k|k-1} + K_k \tilde{y}_k$

Posterior error covariance: $P_{k|k} = (I - K_k C_k) P_{k|k-1}$.

For this scenario, both the weekly requests n and new leases $d_t$ can be observed. So a two dimensional Kalman filter can be used to estimate and update both elasticity and the success rate as:

$$\begin{pmatrix} e_{t+1} \\ \log(s_{t+1}) \end{pmatrix} = \begin{pmatrix} e_t \\ \log(s_t) \end{pmatrix} + w_{t+1}, \quad w_t \sim N(0, Q),$$

$$\begin{pmatrix} \log(r_t) \\ \log(d_t) \end{pmatrix} = \begin{pmatrix} \log\left(\frac{p_t}{\bar{p}}\right) & 0 \\ \log\left(\frac{p_t}{\bar{p}}\right) & 1 \end{pmatrix} \begin{pmatrix} e_t \\ \log(s_t) \end{pmatrix} + \begin{pmatrix} \log(\bar{r}_t) \\ \log(\bar{r}_t) \end{pmatrix} + v_t, \quad v_t \sim N(0, R).$$

A procedure for optimising rent over T weeks and initial capacity of C is shown in pseudo code below.

Data: Current Capacity C and forecast requests r"t
Result: How to use Kalman Filter for Rent Optimisation
Initialization - implement the dynamical programming algorithm to return price p0 with prior guess of e0 and log(s0) ;
for t=1,2, . . . ,T−1 do
    read the change in capacity;
    observe log(rt) and log(dt) ;
    update et and log(st) parameters by the Kalman filter;
    implement dynamic programming to obtain pt ;
end The dynamical programming approach described herein may be applicable to certain applications, where a fixed amount of inventory (i.e. apartments or storage space) needs to be leased until a predefined point in time in the future. The goal is to incorporate demand information in order to optimise revenue.

In example, storage companies have a fixed amount of capacity and they want to charge the optimal price to maximise revenue. The business process here is slightly different. In the residential real-estate world, a potential tenant makes an enquiry for a property with the knowledge of its asking price. But in the self-storage world (at least within the United Kingdom), customers request a quote for a particular storage facility and unit size. This means that recorded requests are not influenced by price.

Figure 8:
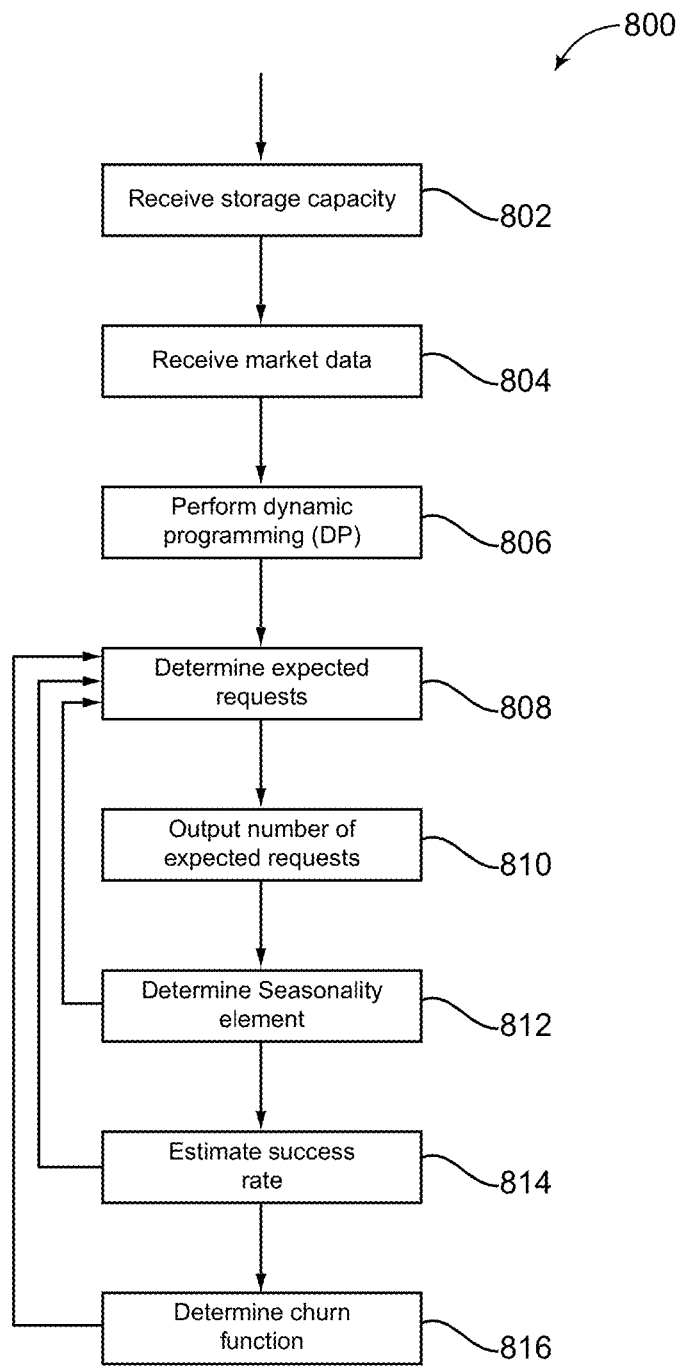
FIG. 8 illustrates a diagram of an example process of determining rental prices of self-storage in accordance with various examples described herein.

In some examples, in a self-storage application, the aim of the optimisation is to find a set of optimal weekly prices for a given homogeneous unit to be leased. FIG. 8 illustrates a diagram of an example process of estimating the number of expected requests in a storage management system over a period of time. A process, such as 800, may be implemented in the system 100 in FIG. 1A. The process 800 may include receiving the storage capacity data at 802 and retrieving other data at 804. For example, process 802 may receive renter application data and/or storage availability information from the property listing rental portal (e.g., 118 in FIG. 1A) via the communication network 102. Process 804 may also retrieve other types of data (e.g., 108, 110, 112 in FIG. 1A) via the communication network 102 or via a direct connection, such as accessing data from one or more memory locations or other storage. Process 800 may further include performing machine learning tasks, such as dynamic programming (DP) at 806. The dynamic programming model will be further explained in detail. The box 806 will use the various data (e.g., 108, 110, 112 in FIG. 1A) or administrator or renter provided data and determine an estimated rental price at 808. The process 800 will output the estimated number of expected requests at 810. For example, the process 800 may transmit the estimated number of expected requests to the property listing portal (e.g., 118 in FIG. 1A) so that the property listing portal 118 may display the result to the user.

In some examples, the dynamic programming in process 806 includes multiple iterations, at each of which the process may adjust by finding the optimal path to maximise the object function and by taking into consideration the parameter changes. For example, as some storage units are rented out or some storage units become available and added to the inventory, the process 806 may produce the estimated number of expected requests accordingly. In a non-limiting example, the process 800 may also include determining seasonality element at 812. The process 800 may also include estimating success rate at 814, and/or determining a churn function at 816. The results of boxes 812, 814 and 816 may be used in the dynamic programming process at 808. Further details are described.

In the self-storage application, the optimisation approach here is slightly different to the multi-family apartment. The main distinction is that the price dependency now lies in the success parameter rather than the requests process. As with the other problems, it is assumed that no occupied capacity will be released. In this scenario a facility owner has some capacity to rent and wishes to update the price to an optimal level on a weekly basis. The optimisation is:

$$\max_{\{p_t\}_{t=0}^{T-1}} \sum_{t=0}^{T-1} (1 - \beta t) p_t d_t(p_t),$$

$$\text{s.t.} \quad \sum_{t=1}^{T} d_t(p_t) \le C,$$

$$p_t \ge 0.$$

$p_t$=asking price at week t
$d_t(p_t)$=units between week t and t+1
C=total initial capacity In some examples, the number of weekly quotes at week t, may be assumed to follow an inhomogeneous Poisson process with intensity parameter $\lambda_t$, and the demand follows a Binomial distribution, with $r_t$ trials and success probability $S(p_t)$. This is formally written as:

$$d_t \sim \text{Bin}(r_t, S(p_t)), S(p_t) \in [0,1],$$

$$r_t \sim \text{Poi}(\lambda_t).$$

where:

$S(p_t)$=success function: $R_+ \to [0, 1]$ $r_t$=sq ft enquired in quotes at week t In some examples, where the success function is expected to be time homogeneous, the optimal price can be calculated deterministically. To optimise the expected price, the system may maximise $E(p^*\text{Binom}(n, s(p)))$ for price p. In some examples, the system may take the first p outside the expectation, and thin the Poisson process with probability $s(p)$. Hence, the expectation is just over a Poisson variable, which there exists a closed form expression for. This expression can then be differentiated, and its roots can be calculated explicitly (although the expression uses the non-analytic Lambert's W function):

$$-\frac{\left(1 + \text{lambertw}\left(\frac{-1}{\frac{A}{e}}, k = 0\right)\right)}{B}.$$

In the situation above, the peak of the profit curve can occur outside the feasible area. In some examples, the system may set the price to be as large as it can be while still being in the feasible area. Hence, the expected amount of area sold in a given week may be equal to the area that will be vacant by the end of the week. This is where the memoryless property becomes valuable. In some examples, it may not be necessary to simulate this with Monte Carlo, because the expected amount of area to be released in a given week may just depends on the total amount occupied at the beginning of the week. Specifically, if the mean contract length in days is m, expected churn that week will be exponentially distributed with parameter 7/m (7 because there are 7 days in a week, this would be 1 if m was measured in weeks). Furthermore, it is safe to assume that this is independent of the current price and demand. Hence the increase in vacancy over the week would be expected to be the current occupancy*(1−exp(−7/m)).

In the example above, to optimise the price, the system may choose the price so that the expected amount of successfully sold area equals the current vacancy area+the churn. The system may calculate the inverse of the success function, which is $$-\frac{\log\left(\frac{(1-y)}{(A*y)}\right)}{B}$$

and input the vacancy+churn.

The following table provides an overview of the dataset the above dynamical programming model relies on. This data set is specific to the application of dynamical programming to leasing of rental units.

TABLE 6

Data schema

| Attribute Name | Description | Type |
| --- | --- | --- |
| EnquiryID | Enquiry unique identifier | numeric |
| Date | Date unit became available | date |
| EnquiryDate | Date enquiry was made | date |
| EnquiryStatus | Status of the enquiry | string |
| Unit type | Type of unit requested | string |
| Postcode | Postcode of the property | string |
| Bedroom | Number of bedrooms | numeric |
| Monthly Price | Monthly rent | numeric |
| Furnishing | Categories: Furnished, Unfurnished, Semi-furnished | category |
| Features | Key features listed | string |
| Description | Description of the property | string |
| ReservationDate | Date when unit was reserved | date |
| MovInDate | Date when new tenant moves in | date |

In storage space rental application, the approach is broken down into the following components: request modelling, success function and dynamical programming. The associated data set is of the form:

TABLE 7

Data schema

| Attribute Name | Description | Type |
| --- | --- | --- |
| EnquiryID | Enquiry unique identifier | numeric |
| Date | Date unit became available | date |
| EnquiryDate | Date enquiry was made | date |
| EnquiryStatus | Status of the enquiry | string |
| Unit type | Type of unit requested | string |
| Site | Identifies the storage site | string |
| Monthly Price per sq ft. | Monthly price per squr | numeric |
| ReservationDate | Date when unit was reserved | date |
| MovInDate | Date when new tenant moves in | date |

Figure 9A:
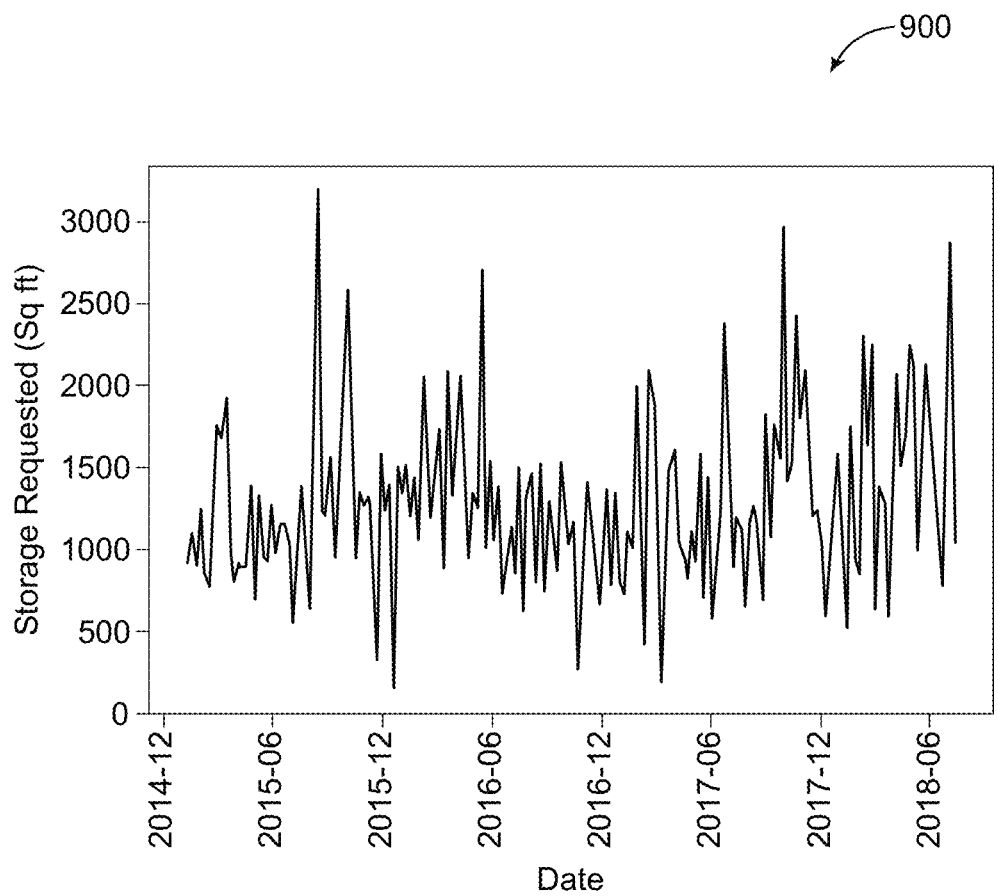
FIG. 9A illustrates example data showing weekly storage requests over a time period in accordance with various examples described herein.

The first key component of the optimisation approach is to model the total units requested each week, $r_t$. This model can then forecast the expected requests. FIG. 9A illustrates a time series of weekly requested storage units. As shown, the graph suggests that the process is stationary. To model the process, the approach may adapt SARIMA, which may further be described below.

SARIMA is the seasonal extension of the autoregressive integrated moving average (ARIMA). It can capture the seasonality element in a time series. The ARIMA model is a regression and is based on a linear combination of past series values and errors. It can only be applied to stationary processes. Hence it is suitable to model the requests. It is denoted as ARIMA(p, d, q) and has 3 parameters:

p: the order of Autoregressive terms d: the degree of differencing q: the order of Moving Average term In this context, 'orders' refers to the number of lags. The SARIMA variation consists of 3 extra parameters: P, D, Q. These are the seasonal variates of p, d and q. A more formal definition is given below. The general SARIMA(p, d, q)(P, D, Q)m process $X_t$ is the solution of the following equation:

$$\Phi(B^m)\phi(B)\nabla_m^D \nabla^d X_t = A(t) + \Theta(B^m)\theta(B)Z_t,$$

where $Z_t$ is white noise and B is the backward operator: $B^n X_t = X_{t-n}$, $$\Phi(B^m) = 1 - \Phi_1 B^m - \ldots - \Phi_P B^{PM},$$

$$\phi(B) = 1 - \phi_1 B - \ldots - \phi_p(B^p),$$

$\Theta(B^m) = 1 - \Theta_1 B^m - \ldots - \Theta_Q B^{Qm},$ $\theta(B) = 1 - \theta_1 B - \ldots - \theta_q B^q.$ where:
$\Phi$=function for Seasonal AR components
$\varphi$=function for AR components
$\Theta$=function for Seasonal MA components
$\theta$=function for AR components
A=deterministic function with respect to time In some examples, as the process is already stationary, there is no need for differencing. So both d and D are set to zero.

Figure 9B:
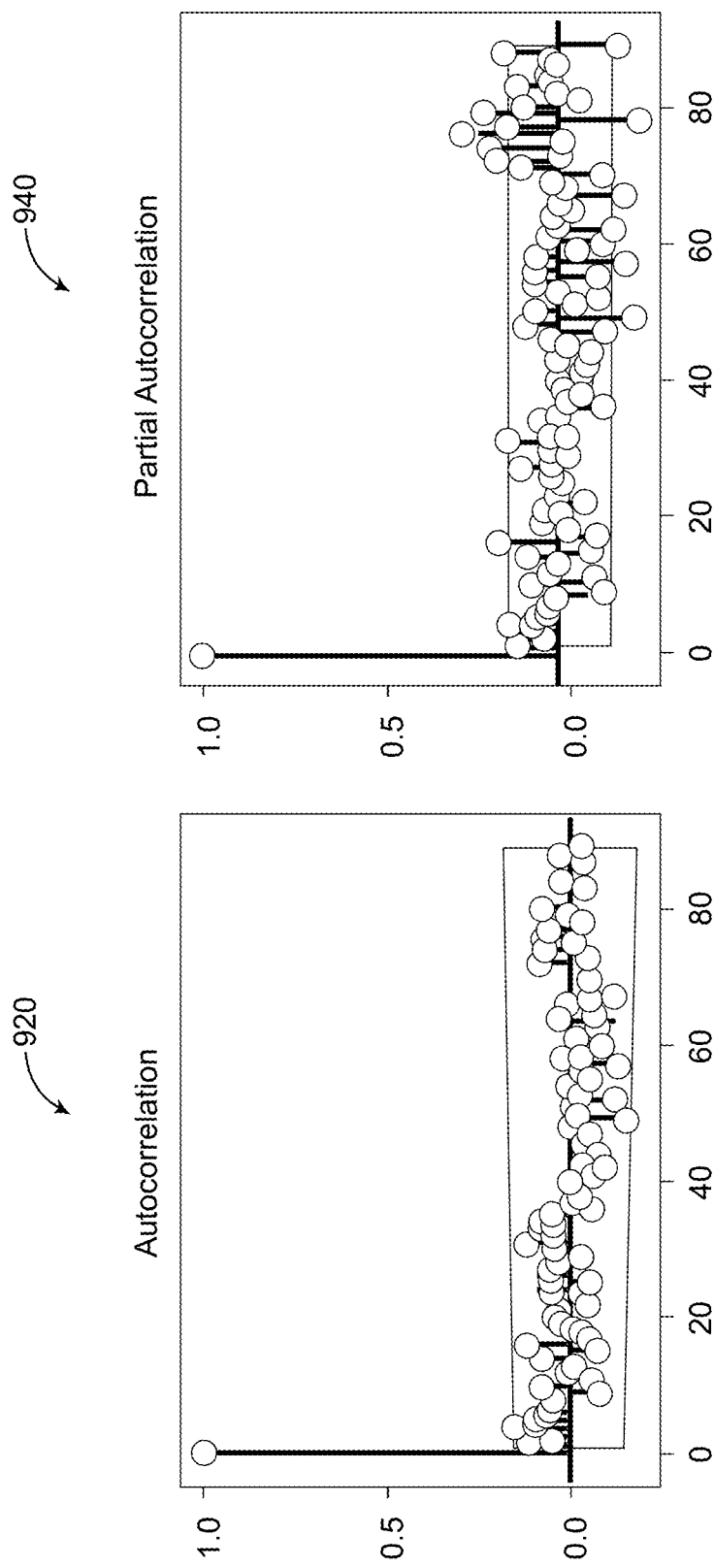
FIG. 9B illustrates example autocorrelation and partial autocorrelation plots over a time period in accordance with various examples described herein.

FIG. 9B illustrates the autocorrelation function (ACF) and partial autocorrelation function (PACF) plots of the series. As shown, there does not appear to be any significant lags in the autocorrelation plot. So MA terms may not be helpful. But there are some in the partial autocorrelation plot. As shown, lag 52 is not significant. This suggests that seasonality may not be prominent in the series. In some examples, a seasonality term may be considered for only up to the first order. This is because an order of 2 would greatly limit the number of in-sample predictions.

Using the Box-Jenkins approach, the best model may be obtained as SARIMA(1, 0, 0)(1, 0, 0)$_{52}$ with an intercept and drift term. So $A(t)=\beta_0+\alpha_1 t$. It had one of the lowest AIC for a model with one Seasonal AR order. The parameters were generally significant, despite the small sample size. An additional non-seasonal AR order would marginally decrease the AIC but resulted in the two AR coefficients becoming very insignificant, with p-values at around 0.35 to 0.45.

The model parameters coefficients are provided in table-8 alongside their standard errors and p-values.

TABLE 8

Requests Model Calibration

| Parameter | Coefficient | Std Error | P-value |
|---|---|---|---|
| Intercept | 1025.22 | 211.373 | 0 |
| Drift | 2.2534 | 1.189 | 0.058 |
| $\varphi_1$ | 0.1295 | 0.106 | 0.221 |
| $\Phi_1$ | −0.1500 | 0.112 | 0.180 |
| $\sigma^2$ | 2.492e+05 | 3e+04 | 0 |

The model coefficients are generally significant, by at least one standard deviation. It's only the seasonal and non-seasonal AR terms that have a slightly high p-values, at around 0.2. The $\sigma^2$ parameter measures the variability of the residuals.

The model calculates a forecast with the formula:

$X_t = \varphi_1 X_{t-1} + \Phi_1 X_{t-52} + \beta_0 + \beta_1 t.$

Table 9 lists some statistics that measure the model's accuracy. The log likelihood is the sum of the residuals' log probability. The Akaike Information Criterion (AIC) and Bayesian Information Criterion (BIC) measure accuracy penalised by model complexity (number of parameters). The aim is to minimise this metric. Their formulas are listed below.

$AIC = 2k - 2\log(\hat{L})$ $BIC = \log(n)k - 2\log(\hat{L})$ where:
k=number of parameters
n=number of observations
$\hat{L}$=log likelihood.

TABLE 9

Model Accuracy Metrics

| Log Likelihood | AIC | BIC |
|---|---|---|
| −1007.694 | 2025.388 | 2039.802 |

Table 10 provides some additional statistics on the model's residuals.

TABLE 10

Residual Statistics

| Ljung-Box | Heteroskedasticity | Jarque-Bera | Skew | Kurtosis |
|---|---|---|---|---|
| 38.07 | 1.61 | 0.05 | 0.5 | 3.36 |

In Table 10, the Ljung-Box statistic tests if a series' autocorrelations are significant. A null hypothesis states that they are not. The p-value is 0.56. Hence the null is accepted. The residuals also show some heteroskedasticity. The Jarque-Bera statistic is used to test the normality of the residuals. The p-value is 0.05. So it is on the borderline for being rejected at a 5% significance level. The residuals also appear to be slightly right skewed. However, its kurtosis is close to normal.

Figure 10:
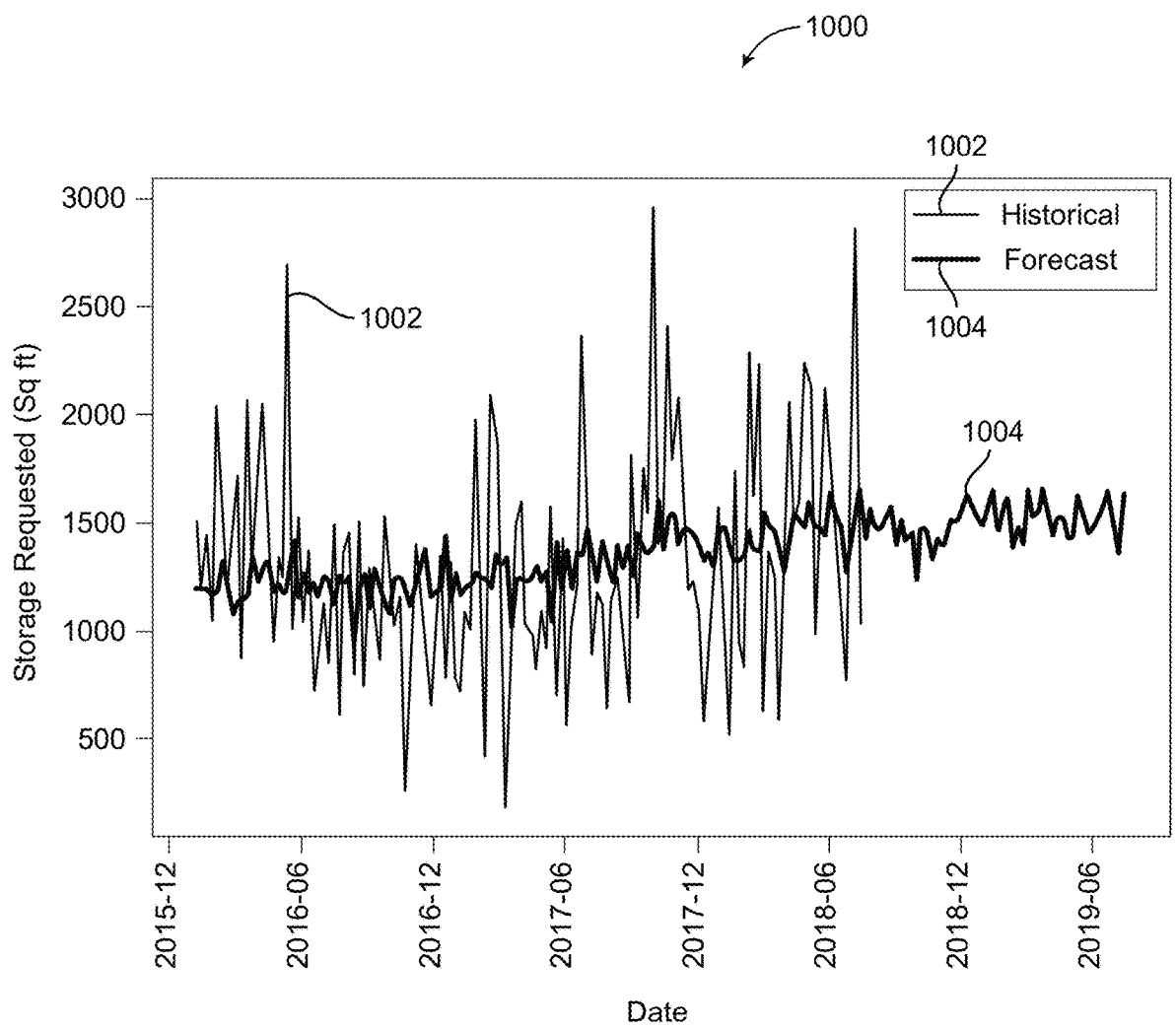
FIG. 10 illustrates example data showing historical weekly storage requests with forecast in accordance with various examples described herein.

FIG. 10 plots the time series in blue, along with the in-sample prediction and 52 week multi-step forecast in orange. The in-sample predictions follows the series fairly well. Although it doesn't capture the large variability. The forecast appears to take a very average view of the series. So this may not be robust to weeks with outlier storage requests. It mostly mirrors the previous year's requests.

The detailing of the SARIMA model here does not preclude the use of other, simpler methods for demand forecasting. For example, good results are received from modelling the demand as a normal variable, as the total demand is the sum of the demand for each smaller unit, and this was further improved by adding a simple seasonality adjustment.

Additionally, a gamma distribution was substituted for a normal distribution in some cases when the method was sensitive to the amount of weeks with 0 demand. A gamma variable would be appropriate as a gamma variable describes the sum of exponential variables, and as each contract is exponentially distributed, the number of contracts at any given time would be roughly exponentially distributed.

The demand may be broken down by unit sizes. However, as it is not difficult to substitute a 50 sqft unit for a 45 sqft unit, for example, the distinction between unit size is often not very important.

Next, successful function of the dynamical programming approach is further described. With a given expected request, the next stage is to estimate the proportion of these requests that become a sale. This leads to the introduction of the next component which is referred as the 'success function'. The success function maps a price to a probability that a quote will become a sale, i.e. $S(p_i): R_+[0, 1]$. Intuitively this success probability should increase with a decrease in price. In some examples, logistic regression can be used to model $S(p_i)$, as further described below.

Logistic regression is a standard statistical model that predicts the odds of a binary event from a linear combination of independent input variables. In this scenario a successful sale is labelled as a '1' and a dead enquiry is a '0'. The input variables are the price and an intercept term. This leads to the following formula for the success function:

$$S(p) = \frac{1}{1 + \exp\{-(\beta_0 + \beta_1 p)\}}.$$

where:
$\beta_0$=intercept coefficient
$\beta_1$=price coefficient
p=price

Here, $\beta_0/\beta_1$ is the price which results in a sale 50% of the time (or the mean successful price) and measures the maximum slope of the curve, which measures how confident the success function is (steep is confident, shallow is not).

Figure 11:
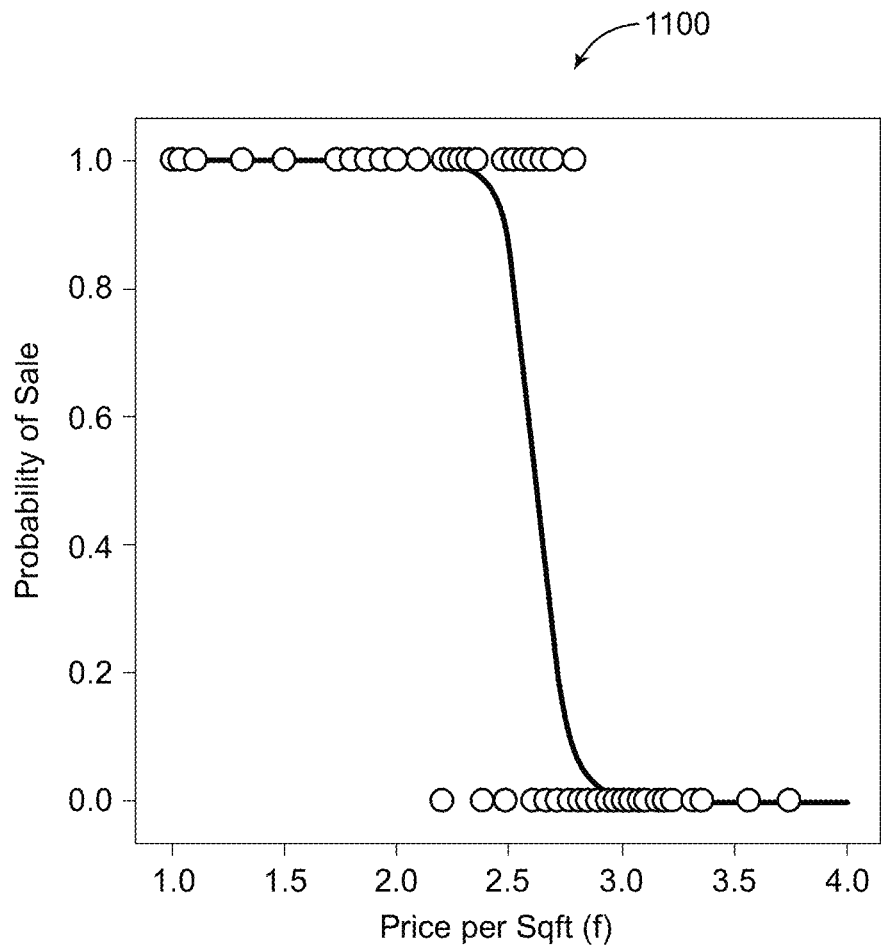
FIG. 11 illustrates logistic regression of sample sales data in accordance with various examples described herein.

FIG. 11 depicts an example of a logistic regression fit onto the enquiry data for 50 sq ft storage units in the selected store. The black dotes represent the enquiries and the red line is the success function. As shown, success is very sensitive to price in the middle region between 2.20 and 2.80 per sq ft. When the price decreases below this region the probability of success doesn't increase much. The sale is almost guaranteed. This could potentially be the cheapest price in the market. And on the opposite side of the spectrum, when the price is above the middle region the probability of success becomes close to zero. This suggests an uncompetitive price.

In some examples, the system may model each unit size (or other distinction between units) separately, when the price per square foot is not consistent across different unit sizes. There is often a 'bulk discount', in that a unit which is twice the area of another is usually less than twice the price. If the unit sizes are model separately, the system may generalise the success function to a success surface, with unit size as the other parameters. The method may include an extravaribale in the logistic regression.

Additionally, or optionally, a churn function HO may be added to the optimisation scheme. For example, $$\max_{\{p_t\}_{t=0}^{T-1}} \sum_{t=0}^{T-1} p_t [d_t^o(p_t) + (1 - \beta t) d_t^v(p_t)],$$

$$\text{s.t.} \quad \sum_{t=1}^{T} d_t^v(p_t) \le C,$$

$$d_t^o \le H(S(t, c_t)),$$

$$p_t \ge 0.$$

where:
$p_t$=asking price at week t
$d_t^o(p_t)$=space demanded from released units
$d_t^v(p_t)$=space demanded from vacant units between week t and t+1
$c_t$=capacity in sq ft at week t
C=total initial space capacity
H(•)=Churn function This additional component has an important impact on the mechanics of the dynamical programming optimisation. Firstly, the capacity can now increase in a time step. So the set of states a node can transition to will be dependent on its occupancy. The algorithm will need to know the maximum leaseable area (MLA). Finally, the discounting requires alteration because the revenue from a newly released unit shouldn't be penalised like a unit that has been vacant since the start of the time period.

The key additional component is the churn function H(.). Within the dynamical programming it effectively acts as an additional deterministic step taken before the transition of the week's demand. In some examples, the churn function take the form:

H: $S(t, c_i) \to R_+$ is such that:

$$H(S(t, c_i)) = M - c_i + 25\left\lfloor \frac{h(M - c_i)}{25} \right\rfloor.$$

where:
h=the churn rate $\square(0, 1)$
M=Maximum lease able units.

In the case where churn is incorporated, the system may forecast the occupancy of the storage units. To do this, the system may model the length of the contracts. In greatest generality, each type of contract (varying by location, unit size and unit features) would have its own parameter. However, due to data constraints, some of these groups of contracts can be pooled and modelled together.

An exponential random variable may be expected to most appropriate for this distribution, as the exponential distribution has the 'memoryless property', which means that the distribution of the remaining number of days in a contract is independent of the number of days the contract has lasted already. However, other variables, such as Gamma random variables, may also be appropriate, due to other features of the data. Alternatively, and/or additionally, the system may pool contract groups in any suitable manner.

The exponential approximation has a large benefit to our model: to forecast the number of contracts that will expire in a given period (the churn), the system may only need to know the current number of contracts.

There may be an issue of censorship in this data, in that some contracts in the data set are unfinished. This is relatively easy to deal with statistically, using methods from survival analysis for estimating the mean of censored data.

In some examples, there are a few additional parameters which can optionally included. Restrictions on the price spaces can be included. These can be simple, such as prices restricted to multiples of 5 or a global maximum process, or more complex, such as the prices of a unit of type A must be 10% less than units of type B. In an example implementation, the default method to resolve a pricing conflict between the optimal price and a price restriction will be to adjust the prices concerned, weighting the magnitude of the adjustment by the volume of the units of those types concerned.

Another example of such a parameter is the speed of a price adjustment. The user may not wish prices to fluctuate too wildly, accordingly, the system may include a maximum daily price change (absolute or relative change).

In some examples, an optional feature of discounting may be implemented. At the most basic level, our model produces an optimal price. However, this price can be presented to the customer in many ways. In some examples, the system may use the model to identify areas where the marketing strategy can be modified. In some examples, the system may adjust the marketing strategy so that, after discounts have been applied, the resulting price is the optimal price.

In situations with low data, the model may lack certainty in its predictions. In these cases, the system provide a measure of confidence in the results the model outputs (calculated through monte carlo simulation, or explicitly, if tractable). The user may choose how much weight to give the model's recommendation.

The model can also be used to reprice existing contracts. If some contracts were made a long time ago, and the price of the operating the business has changed since then, the user may wish to reprice these long contracts. Underperforming contracts are identified as the contracts that have a lower value than the model's price forecast (calculated through monte carlo simulation, or explicitly, if tractable) over the next number of weeks equal to the expected remaining contract length in weeks conditional on the contract lasting as long as it has (calculated empirically, using survival analysis). An additional buffer amount can be added here to cover the costs of repricing. These lower value contracts should be repriced to the average value of the forecast.

Figure 12:
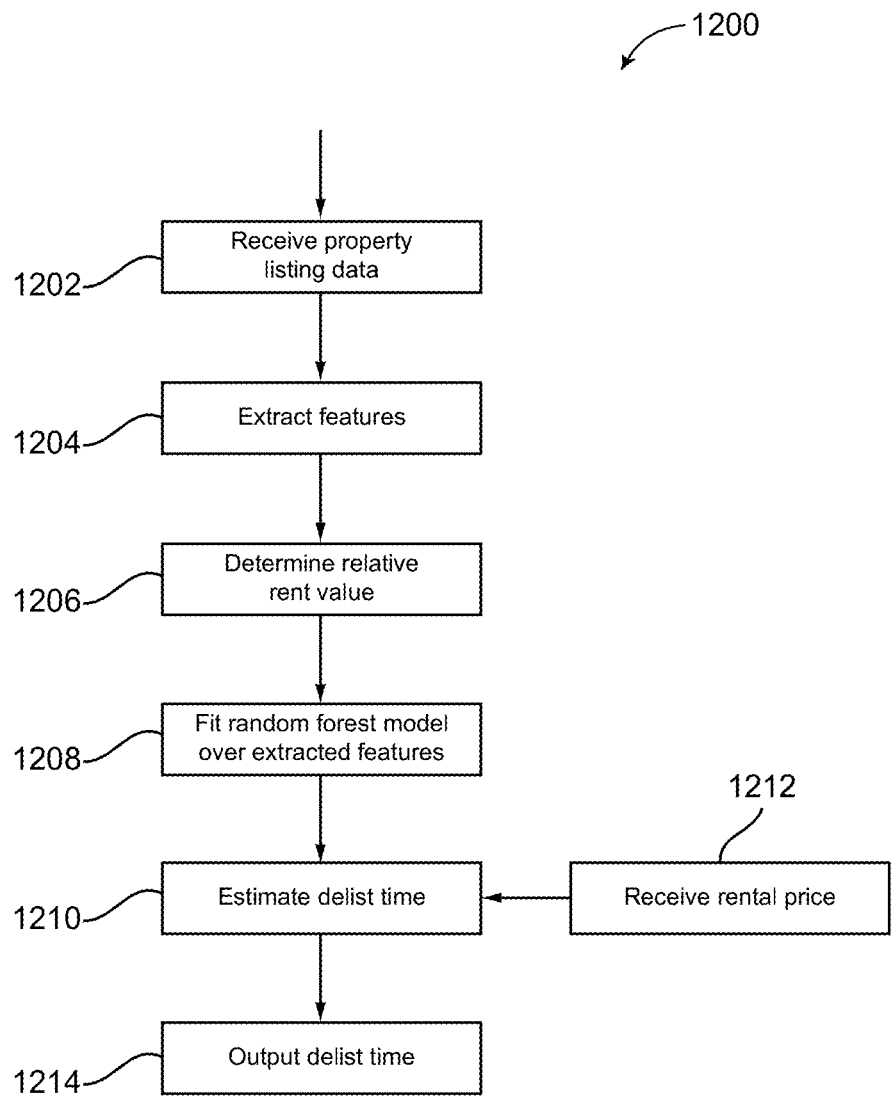
FIG. 12 illustrates a diagram of an example process of estimating delist time in accordance with various examples described herein.

In some examples, the system may analyse some listing data to determine the relationship between price and the length of time a property is on the market. FIG. 12 shows a diagram of an example process of estimating the time to delist a property unit given a certain price. In some examples, machine learning methods may be used to determine the Estimated Rent Value (ERV) of a property as a measure for potential revenue. The details are further described. In some examples, a process 1200 may be implemented in the rental price prediction unit 104 or property listing portal 108 (in FIG. 1A). The process 1200 may include receiving property listing data at 1202. For example, the process may receive the property listing data from the property listing portal 108 (in FIG. 1A) or one or more databases 108, 110, 112 (in FIG. 1A). For example, in some examples, the data acquired comprises of 3 snapshot listings of rental properties in London. The scrapes occurred on dates: 20 Jun. 2018, 26 Jun. 2018 and 2 Jul. 2018. Each scrape has approximately 63,000 properties. The relevant raw attributes are listed in Table 11.

TABLE 11

Data schema

| Attribute Name | Description | Type |
|---|---|---|
| ID | Property unique identifier | numeric |
| Property Name | Title of the property that includes the number of bedrooms and property type e.g. '3 bedroom apartment' | string |
| Postcode | Postcode of the property | string |
| Bedroom | Number of bedrooms | numeric |
| Monthly Price | Listed monthly rent | numeric |
| Date Added | Date the property was added. Or the date of price reduction. (If the rent was reduced) | date |
| Furnishing | Categories: Furnished, Un-furnished, Semi-furnished | category |
| Features | Key features listed | string |
| Nearest Stations | List of the 3 nearest tube/train stations alongside their corresponding distances to the property | string |
| Description | Description of the property | string |

By removing duplicate properties between scrapes the 3 datasets are merged into one. In total there are 84,333 unique properties. In the case where there was a price reduction for a property in-between scrapes then the reduced price entry is chosen along with the date of reduction as the property's 'Date Added'.

The process 1200 may further extract features from the available data at 1204. For example, some features and attributes are extracted from the raw data, such as shown above. For example, the text from both 'Features' and 'Description' was parsed to extract key words and phrases attributes. These attributes were binary indicator variables stating whether a certain key word or phrase was written in the 'Features' or 'Description'. The list of key words and phrases is as follows: 'Gym', 'Reception', 'Study', 'Modern', 'Parking', 'Garden', 'Spacious', 'Balcony', 'Concierge', 'Communal', 'Patio', 'Amenities', 'Students', 'TV', 'Terrace', 'Victorian', 'Conservatory', 'Dishwasher', 'Swimming Pool', 'Newly Decorated', 'Open Plan', 'En Suite', 'Ground Floor' and 'Double Glazing'. The phrases 'Two Bathrooms' and '2 Bathrooms' were also captured and then combine to form a new binary variable indicating whether the property has two bathrooms or not. The lower case form of all these words and phrases was also included in the extraction.

The system may further transform the Point of Interest variable (e.g., 'Nearest Stations' variable) into a collection of attributes for each point of interest that measured the proximity between the property and a point of interest. Point of interest variables may include residential or commercial points that may be of interest, such as, e.g., downtown or urban centers, park and ride centers for public transportation, free way access, or the like. In an example, the metric $w_{ij}$ for property i and station j has the following values:

$$w_{ij} = \begin{cases} 10 - m_{ij} & \text{if station } j \text{ in listed is the 'Nearest Stations' of property } i \\ 0 & \text{otherwise} \end{cases}$$

where $m_{ij}$ is the distance (in miles) between property i and station j which is embedded in the 'Nearest Stations' attribute. The $w_{ij}$ for property i and other point of interest j may be defined in a similar manner. This metric is like a score from 0 to 10. Zero means the property and station are very far apart; in that there are at least three other stations closer to the property. While a ten suggests the property and station are located in the exact same spot. In the dataset used, for example, the maximum value for $m_{ij}$ is 4.6 miles. Hence $w_{ij}$ will always be non-negative. As there are 687 stations and each property only lists 3, the matrix $W=(w_{ij})$ is very sparse.

Additionally, the system may further extract the property type from the 'Property Name'. This introduced a new category comprising of: 'Apartment', 'House', 'Shared property', 'bungalow', 'penthouse', 'maisonette', 'Duplex', 'Triplex' and an 'Undefined' category for anything else. It's worth noting that the text features rely on the landlord inputting complete information on the property. So there may be some key word features missing because the landlord didn't write them into the advertisement or they used a synonym which wasn't considered. The final dataset had 726 features.

In some examples, when 1 and 2 bedroom properties are the main focus, the dataset may be selected to include only these kinds of asset class. The dataset may further be reduced by removing properties that were priced above an amount, such as £10,000 per month. This is seen as a sensible limit for feasible properties. Anything more expensive is susceptible as a potential outlier. When applying the feature extraction mentioned above, a dataset with a total of 53,806 observations was resulted.

In some examples, the process 1200 may further determine relative rent value at 1206, fit random forest model over extracted features at 1208, and estimate delist time at 1210 based on the fitted random forest model. For example, using the fitted random forest model, the process 1200 may receive a given rental price at 1212, and based on the given rental price, assess the random forest model to determine the estimated delist time at 1210. The process 1200 may further output the delist time at 1214. Further details of the random forest model are provided.

In some examples, once features are extracted, a random forest model may be applied because of its robustness and non-linear nature. A random forest is a non-parametric statistical model made up of multiple regression trees. Regression trees are a predictive model in themselves and work by breaking down the predictive space into a finite number of disjoint regions. The regions are defined by the input explanatory variables. Each observation will belong to a particular region. And each region is allocated a prediction, which is usually the mean of its observations response values. Any new observation that falls into a specific region takes that regions coefficient as its prediction value. When constructing a regression tree the aim is to minimise the residual sum of squares (RSS). However the formula for the RSS is different from linear regression. It is:

$$\sum_{j=1}^{J} \sum_{i \in R_j} (y_i - \hat{y}_{R_j})^2,$$

$$\hat{y}_{R_j} = \frac{1}{|R_j|} \sum_{i \in R_j} y_i.$$

where $R_1 \ldots R_J$ are the regions and $\hat{y}R_j$ is the prediction value for observation $y_i$.

Due to the vast number of possible partitions of the predictive space, an algorithm is used to build a tree using a top down approach. The algorithm starts with a single region that contains all the observations. It then chooses one of the explanatory variables with a cut-off point and splits the region into two smaller regions: one with all the observations below the cut-off point and one with all those above it. The algorithm finds the value of the cut-off point that minimises the RSS. This binary splitting process repeats until a certain criteria is reached. A standard example could be that all the regions have less than a certain number of observations.

A random forest is constructed from multiple trees using bootstrapped data. Each tree also uses a different subset of explanatory variables. And then the prediction value for an observation is calculated from an average of the trees' coefficients. This approach has several advantages. Firstly, the bootstrapped data creates a collection of uncorrelated trees which prevents the risk of over-fitting. Secondly, the subset of explanatory variables encourages the opportunity for less predictive variables to be used in the fit. This may seem counter-intuitive but there may be some valuable information in those variables. And the greedy nature of the binary split will overly favour the most predictive variables.

A random forest of 75 trees was fitted on the dataset with all available features. The ten most important features were: 'bedroom', 'Bond Street', 'Concierge', 'Gloucester Road', 'Knights-bridge', 'Sloane Square', 'South Kensington', 'Reception', 'Hammersmith District & Piccadilly' and 'Marylebone'. The significant importance in 'bedroom' is expected because it is a clear measure for property value. The important station variables seem to be located in very expensive parts of London, particularly in the west and central areas.

Figure 13A:
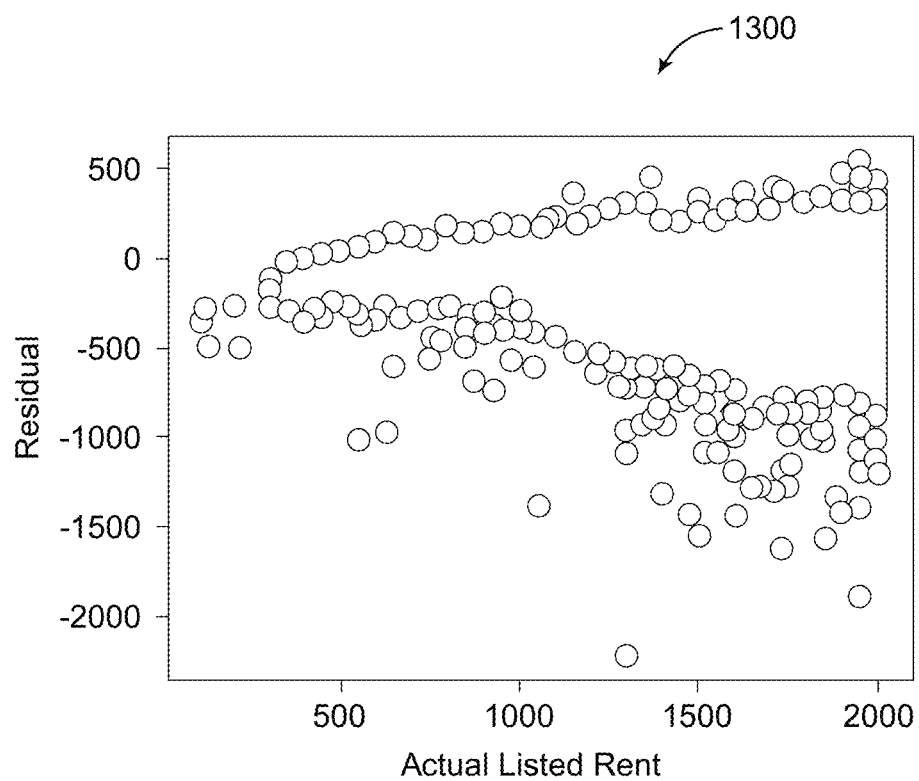
FIG. 13A illustrates example residual plot of the random forest in accordance with various examples described herein.

FIG. 13A shows the residual plot of the fit. As shown, the variance of the residuals increases for more expensive properties. There is also a skew towards large negative residuals which suggests some heavy over-estimating.

Further, a model is built to predict a property's time on the market when listed at a certain price. With the example dataset, the time to delist can be measured for the 13,391 properties that delisted between the scrapes. This is detected by the data entry being in one scrape but not in the following one. It can therefore be deduced that the property was taken off the market sometime between the two scrapes. It is assumed that all these properties were delisted at the mid-point date between the scrapes. So for the first two scrapes, the delist date is estimated to be 22 Jun. 2018. And the delist date between the last two scrapes is set at 29 Jun. 2018.

In some examples, the time to delist can then be measured by the number of days between 'Date Added' and the delist date. This metric carries some assumptions. Firstly, it assumes that all landlords take down a property advertisement immediately after it has been taken off the market. This practise will vary between landlords. Unfortunately, estate agents are known for leaving taken properties on listing pages to acquire more leads. Secondly, it assumes that every delisting implies a sale. An estate agent could delist and immediately relist the same property as a new listing. So a new lease did not actually take place. And finally it assumes that the actual transaction price is the same as the listed price. In other words, there is no negotiation and all potential tenants are price takers. This could be reasonable for some areas, such as London due to the city's competitive rental market. But there is some negotiation generally expected to occur.

Figure 13B:
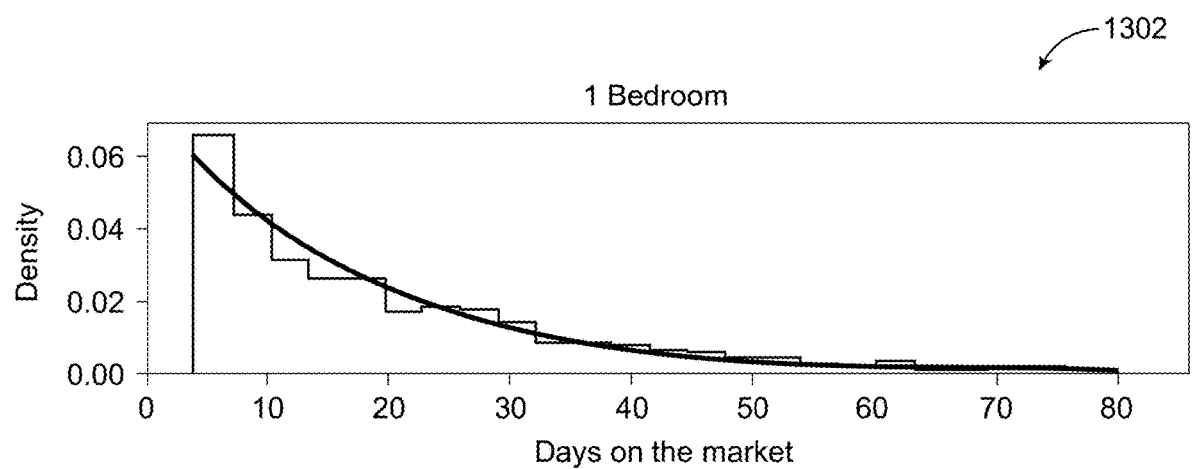
FIG. 13B illustrates example histograms of time to delist for 1-bedroom apartments in accordance with various examples described herein.
Figure 13C:
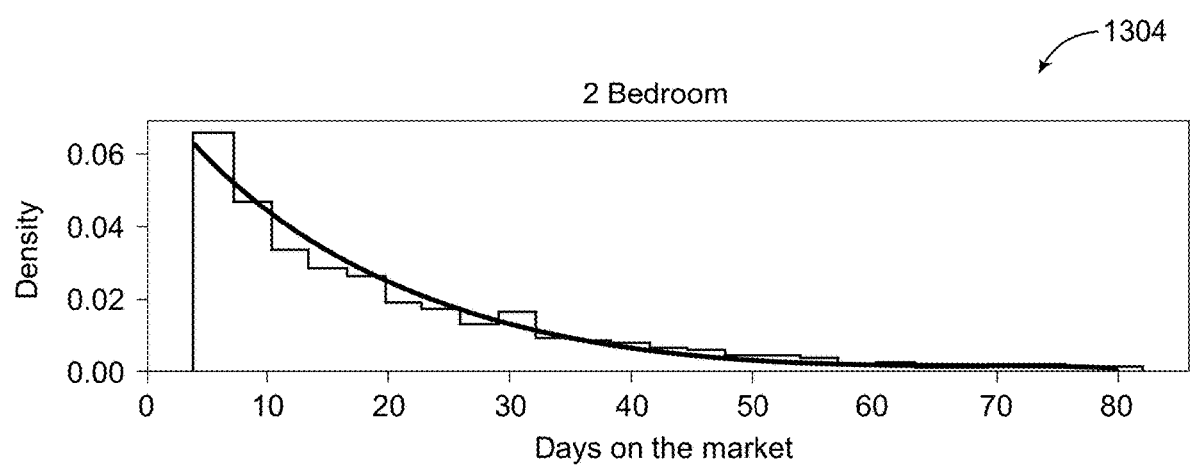
FIG. 13C illustrates example histograms of time to delist for 2-bedroom apartments in accordance with various examples described herein.

FIGS. 13A and 13B illustrate the example histograms of time to rent for 1 and 2 bedroom properties, respectively. As shown, the histograms appear to resemble exponential distributions. The red lines are fitted exponential curves. The bedroom types have very close rate parameters. 1 bedroom has a rate of 16.58; while the rate for 2 bedroom is 16.35. This suggests that 1 and 2 bedroom have very similar liquidity.

In some examples, a direct approach may be used to predict the time to delist by fitting a machine learning algorithm with time on the market as the response and the property's price and other characteristics as inputs. Alternatively, and/or additionally, relative price (rather than absolute price) of the property compared with the market may be used, which impacts the time to delist. Let's define the concept of relative rent value for a property i as:

$$v_i = \frac{\hat{y}_i}{y_i}.$$

This is essentially the proportional residual of the random forest model described earlier. The model's ERV in this case is a proxy for the fair market value of the property. It is assumed that this residual is caused by the landlord setting the price differently from the market value. So when $v_i > 1$, the property is over-priced. And conversely when $v_i < 1$, the property is under-priced. Therefore, there is expected to be a positive relationship between v and time to rent.

Possible causes for the residual may exist. For example, one cause may be missing variables from the dataset that signal quality or value. For example, the precise size of the property will likely have an impact on the ERV. But the data only subjectively captures this information with the 'Spacious' key word attribute. So there is a great dependency on the validity of the ERV model. The results suggest there's not much signal between the relative rent value and time to delist.

Figure 14A:
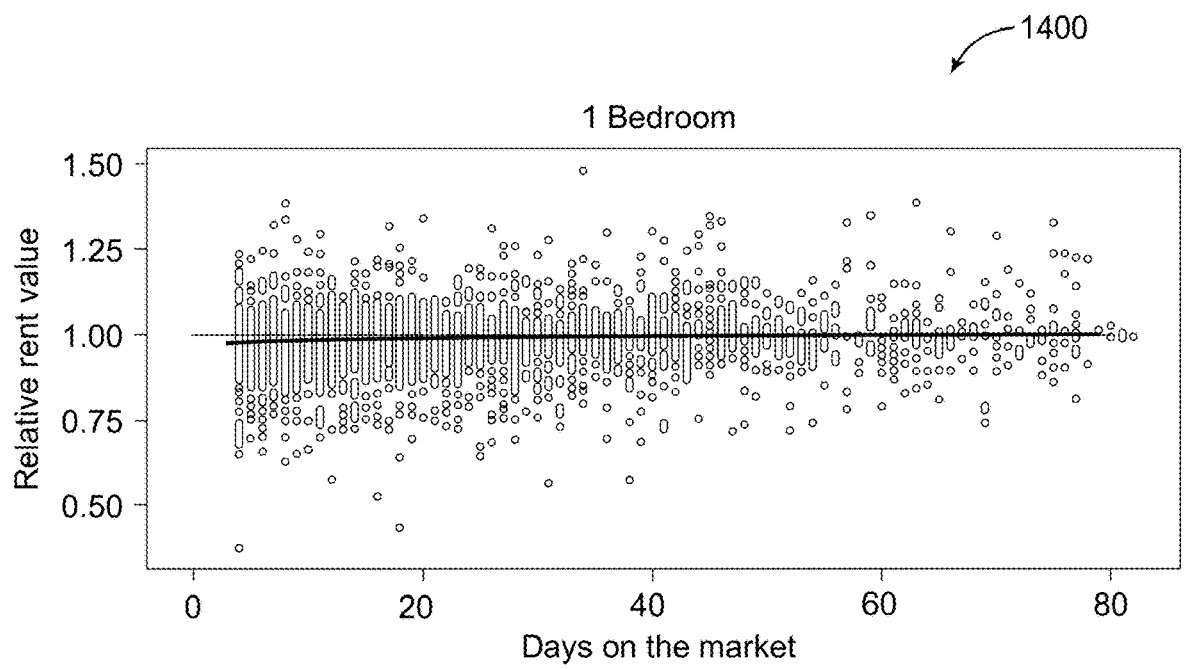
FIG. 14A illustrates example plots of time to rent vs relative rent value for 1-bedroom apartments in accordance with various examples described herein.
Figure 14B:
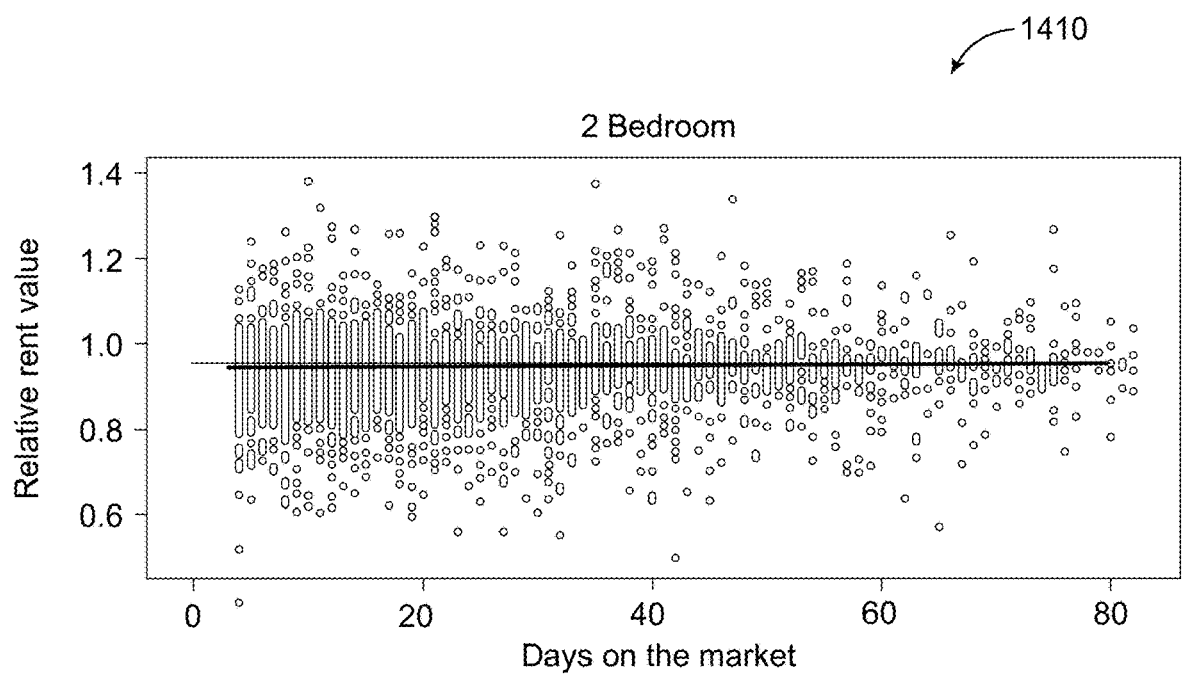
FIG. 14B illustrates example plots of time to rent vs relative rent value for 2-bedroom apartments in accordance with various examples described herein.

FIGS. 14A and 14B are scatter plots which visualise the time to rent vs relative rent value by bedroom type. As shown, the red curves are fitted power law functions, which may take the form of:

$$p_b(s) = \beta_0 + \beta_1 s^{\beta_2}.$$

As shown, the red curves are very close to a horizontal line of $v_i=0$. It seems that properties can take a large range of the supposed relative rent value and still get delisted quickly. Perhaps the relationship is better defined for cheaper properties. The potential tenants for this level of real estate might be more price sensitive.

Figure 15:
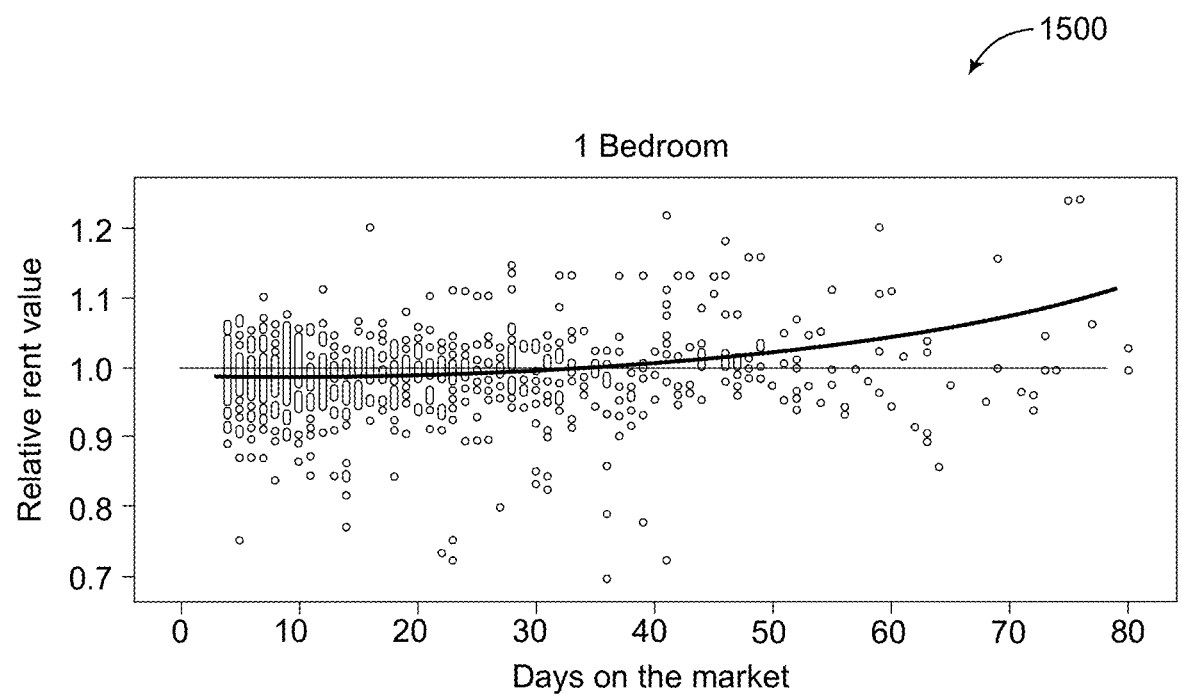
FIG. 15 illustrates example plots of time to rent vs relative rent value for entry level 1-bedroom apartments in accordance with various examples described herein.

FIG. 15 shows the scatter plot for 1 bedrooms that had an asking rent between £1,000 and £1,200 per month. These values were chosen arbitrarily, based a feasible guess of the price for an entry level 1 bedroom property in London. Whilst the power law curve (red) is more prominent; the relationship for early delists remains slight. And the significant curve for long delists is likely due to small sample issues.

In some examples, the rental price prediction unit 104 may additionally include amenity price prediction unit configured to price the individual amenities of an apartment, such as hardwood floors, or stainless steel appliances. Because these amenities cannot be sold independently of the property, so this price should be considered as the marginal price of that amenity. In other words: it is how much more the system would expect the property to sell for, if a property that lacked that amenity were to gain it, or how much less a property would sell for if it lacked an amenity it currently has.

The system may calculate this marginal price by including the presence of these amenities in a model for pricing the properties, then, use this model to calculate the partial dependence of the feature corresponding to a particular amenity, on the price prediction.

In a non-limiting example, let f be a machine learning model consisting of N features, $\{x_i\}_{i=1}^N$ map the space of apartments or properties with those features to a numerical price. The partial dependence of the output price on a variable $x=x_i$ (or collection of variables, $x=\{x_i\}_S$ for some $S \subset [N]$) is defined as:

$$f_x(\cdot) = \mathbb{E}_y[f(\cdot, y)]$$

where $y=x/\{x_i\}_{i=1}^N$, i.e. the rest of the features in the model, and the expectation is taken over these variables, holding x constant.

The expectation is calculated empirically. This calculation can grow quickly, but fortunately, as most variables in the model will be binary (either an amenity is present or it is not) which makes this empirical calculation tractable.

The amenity of each property in the data set is then priced according to the following algorithm. For each property p in the data set: (1) Drop p from the data set and train a machine learning model predicting property price on the remaining data; (2) For each amenity a in the data set: (a) define a new property, $p_a$, by taking p and toggling the presence of amenity a from True to False (or vice versa); (h) calculate f (p)−f ($p_a$); (3) Repeat from step 1 and 2, for a number of iterations (e.g., at least 30 times) by changing the seed of the training model, and store the results. This gives us an estimate of the price of the amenity, and the variance in this estimate due to model uncertainty can be estimated through the repeated samples taken in step 3.

In cases with a low data, the individual property level predictions can be quite inaccurate. However, the system may use these predictions to identify amenities which are likely having an impact on the price (even that impact may not be measured accurately). To do this, the system may be configured to rank the predictions. For example, a "green" level of confidence is given with the estimate of marginal price is further than one standard deviation from 0. This suggests that the amenity is likely having some impact on the price. A "yellow" level of confidence is given with the estimate is less than one standard deviation from 0, but more than half a standard deviation. This suggests there is some evidence that the amenity has some impact on the price, but it is not conclusive. A "red" level of confidence is given with the estimate is less than half a standard deviation from 0. This suggests there is very little evidence that the amenity is having an impact on the price. The thresholds can be changed, according the level of accuracy the user may desire.

In some examples, non-amenity variables can be included in the calculation. For example, a user may be interested in location and number of bedrooms. In this case, the system may modify the algorithm by toggling not just the amenities in b) but the location and/or number of rooms also.

FIGS. 16-21 illustrate various examples implementing one or more embodiments described in the present disclosure. These examples may include user interfaces, functionalities that may be implemented in any of the systems or processes described in the present disclosure, such as FIGS. 1A-1C, 8 and 12. For example, in FIG. 16, in the user interface 1600, a user can log into the system and analyse at a high level, for multiple properties (in this instance in Dallas, California, London, Chicago, New York City) a few high level key performance indicators. In this non-limiting example, the key performance indicators include property level occupancy, available units to rent, number of units leased last week, the current rent, the competitive rent, and recommended rent. The system also allows the user (e.g., a manager of revenue for rental properties) to approve, modify or reject the recommended rent. The system may also post the rent, along with the description of the properties, to their websites or third party platforms where the rental properties are advertised, along with the optimal rental price on them as well.

Figure 17:
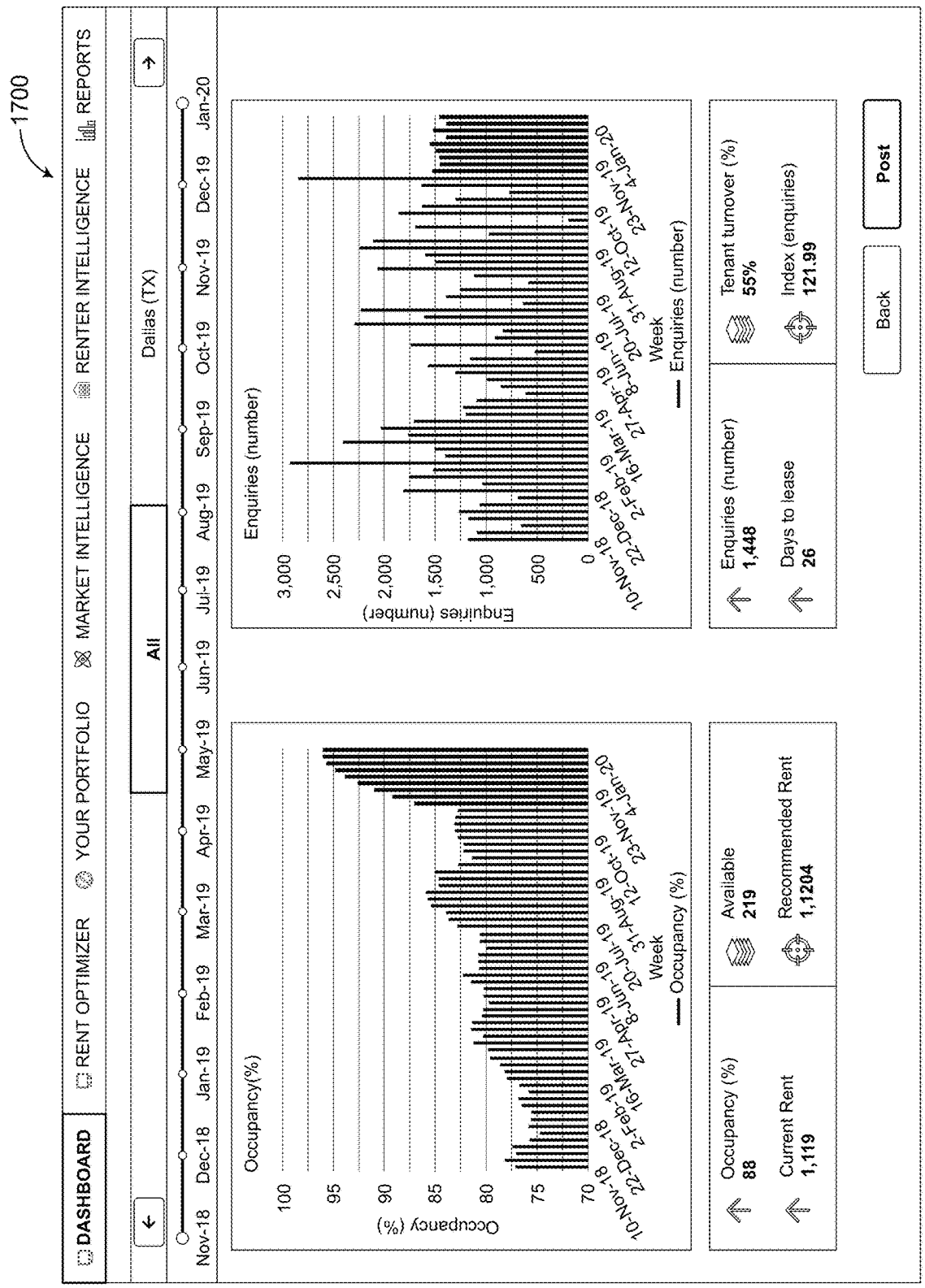

In the example in FIG. 17, e.g., user interface 1700, the system may simulate historical occupancy and demand as well as allow user to visualise model forecasted demand and enquiries. The system may choose smaller periods of time based on the slider on top which allows user to sub-group or regroup such periods, allowing the user to validate the property unit prices suggested on the earlier screen.

Figure 18:
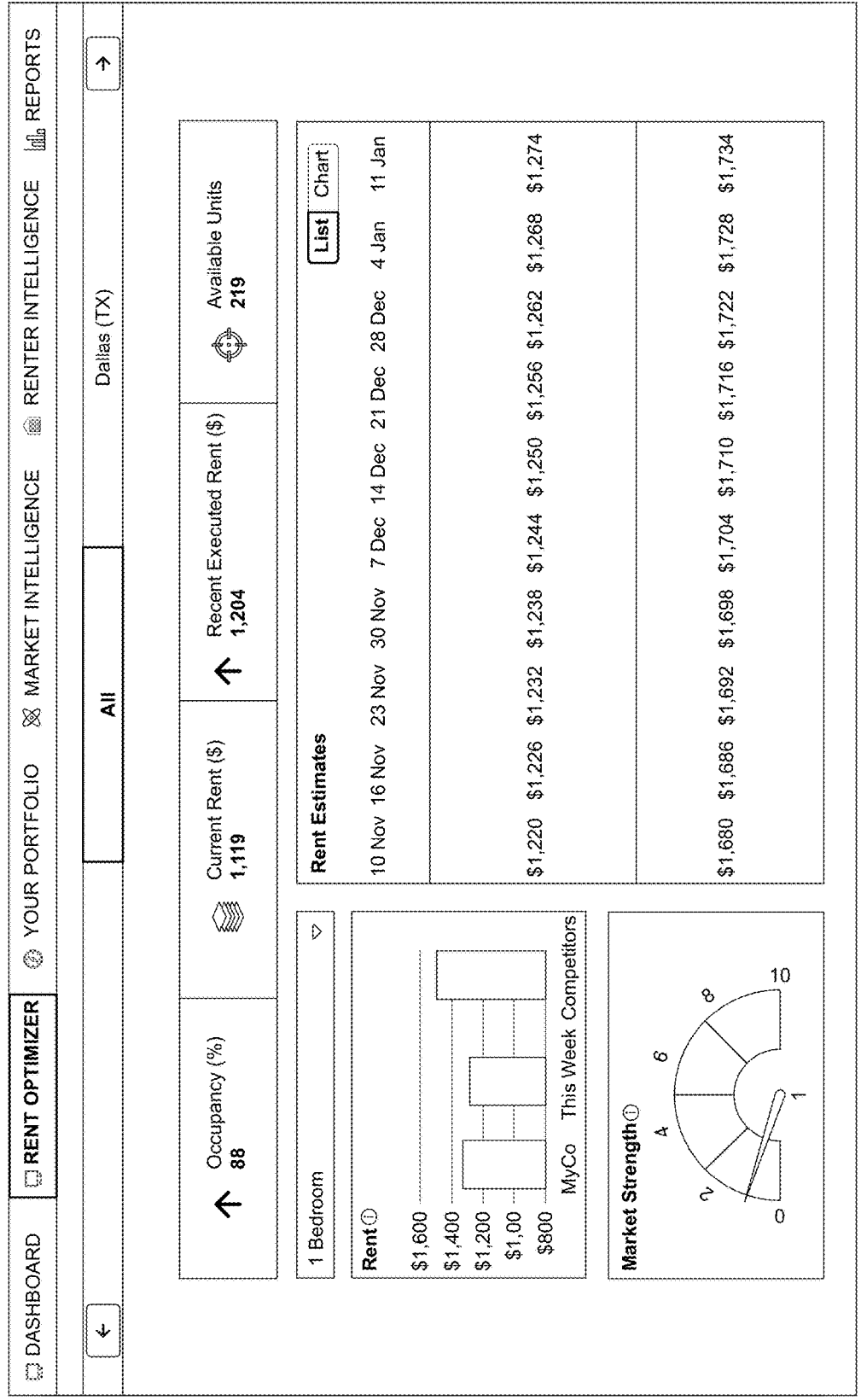

In the example in FIG. 18, a user interface screen 1800 displays the optimal rent for different start dates of tenancies in a list or a chart format. It also displays for each property unit type (e.g. 1 bedrooms, 2 bedrooms, 2 bedrooms with balconies) the optimised rent to charge at varying duration of lease length. In some examples, the system may allow a user to click on the "Competitors" bar, which will display the competitor's pricing page.

Figure 19:
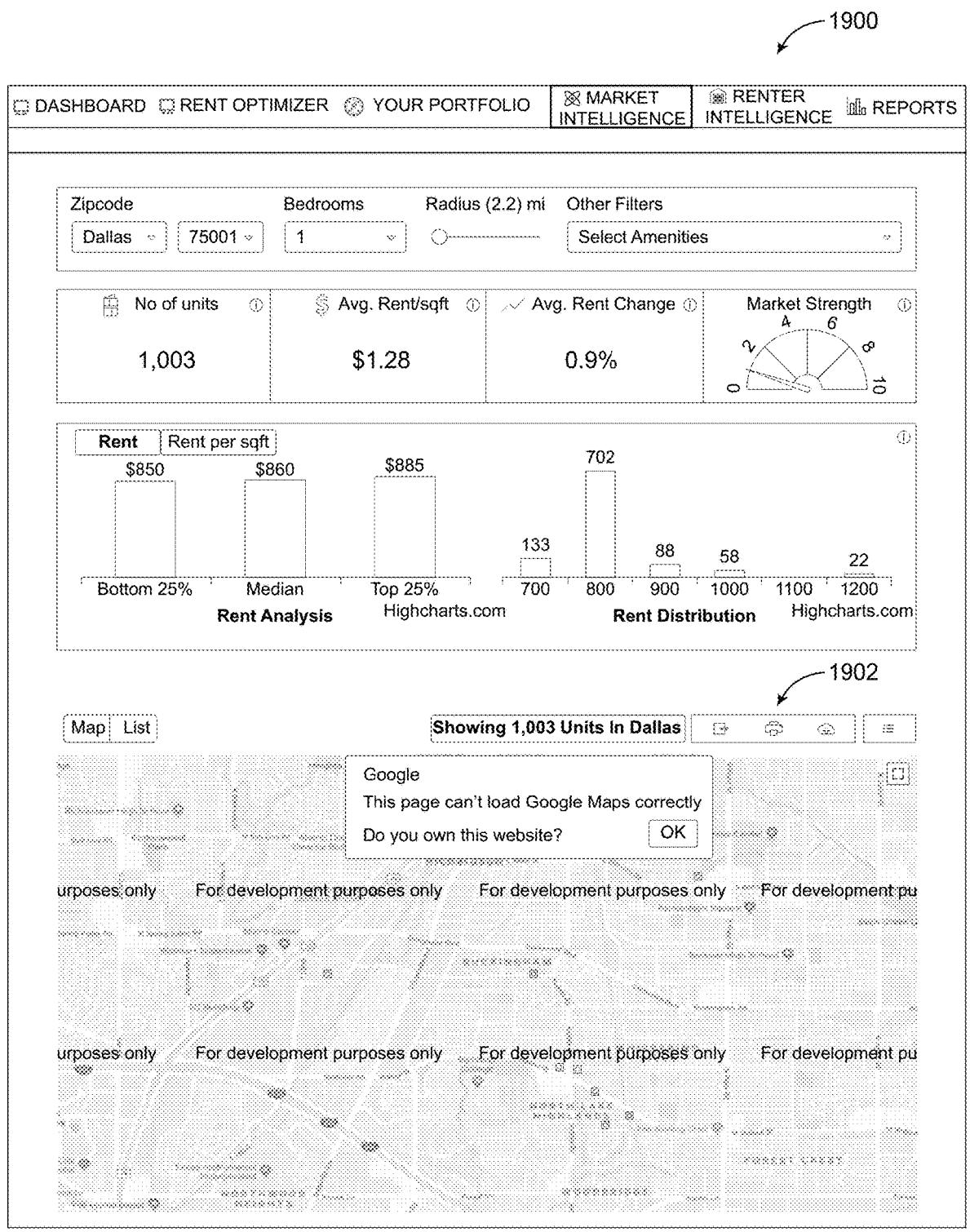

In FIG. 19, a competitive market intelligence screen 1900 displays the rent prices for surrounding properties. In some examples, the system may filter the properties by the number of bedrooms, amenities, and display the rent distributions, average rents and number of other properties available to rent at the price levels that are being suggested. The system may concurrently display a map of the neighborhood (e.g., in 1902) with the properties overlaid on the map.

Figure 20:
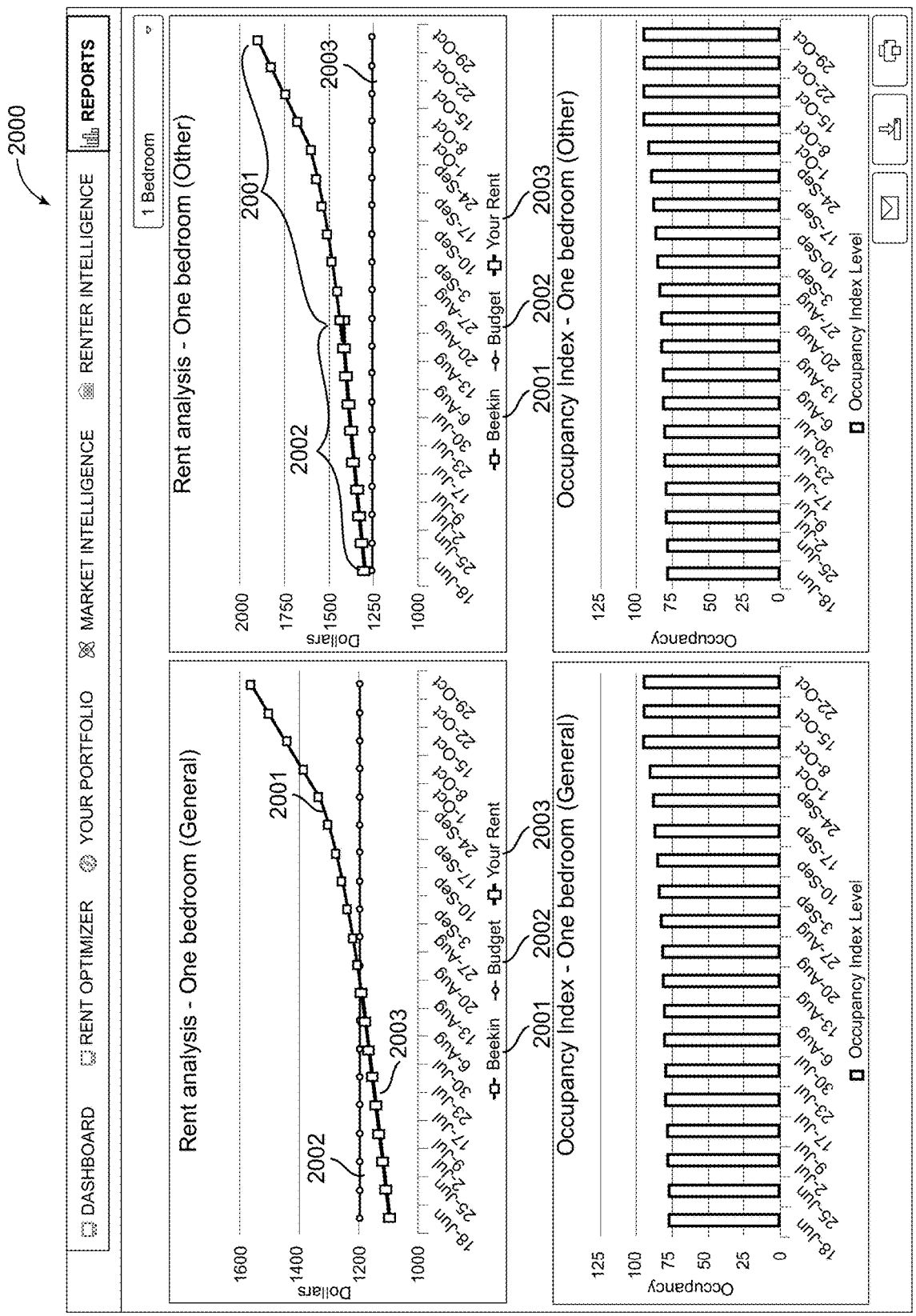

In FIG. 20, in the user interface 2000, the reports tab allows the user to invoke a display of the performance of the model. For example, the bottom two plots display the system performance for which the occupancy index shown in bars allows the user to ascertain both projected and actual occupancies. In some examples, the top two plots display the user's rent in a beginning period (e.g., 2003) and the actual rent paid by customers, which was recommended by the system (e.g., 2003).

Figure 21:
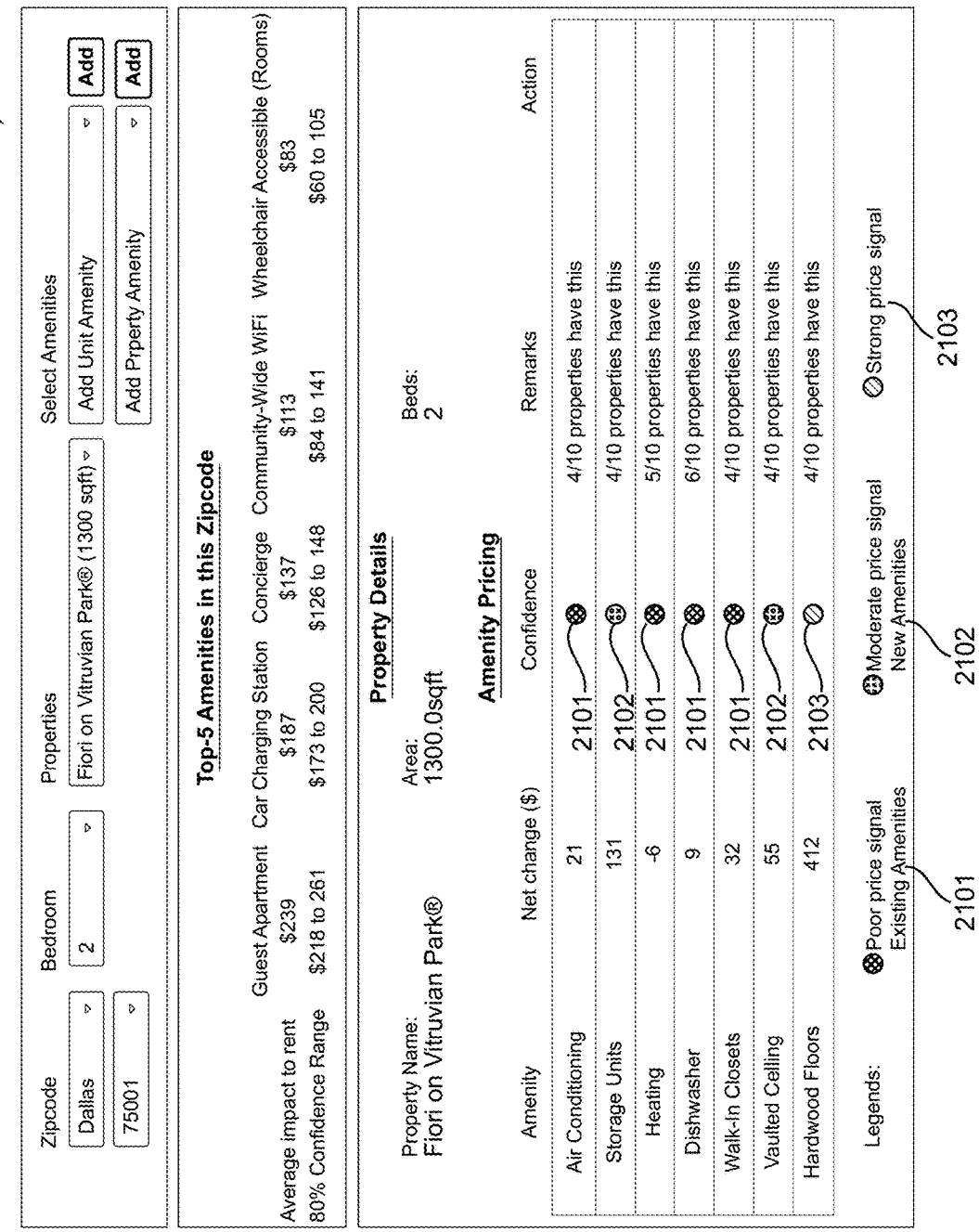

In FIG. 21, the user screen 2100 displays the amenity price sheet is aimed at letting users understand the value of a certain unit amenity (stainless steel appliances, dishwashers) versus a property-level or community-wide amenity (concierge, gym). For example, the system displays the top amenities, which in this example, include guest apartment, car charging station, concierge, community-wide Wi-Fi and wheelchair accessible (rooms). The bottom of the screen further displays the confidence level of the impact of the amenities in impact bands, such as low (2101), medium (2102) and high impact (2103). In some examples, the system may also display the count of competitors' properties with similar amenities. The function shown in 2100 may allow the user to choose new amenities and add them to a unit, to understand the impact of those amenities on rent. This represents significant time saved in proposing and choosing amenities.

Figure 22:
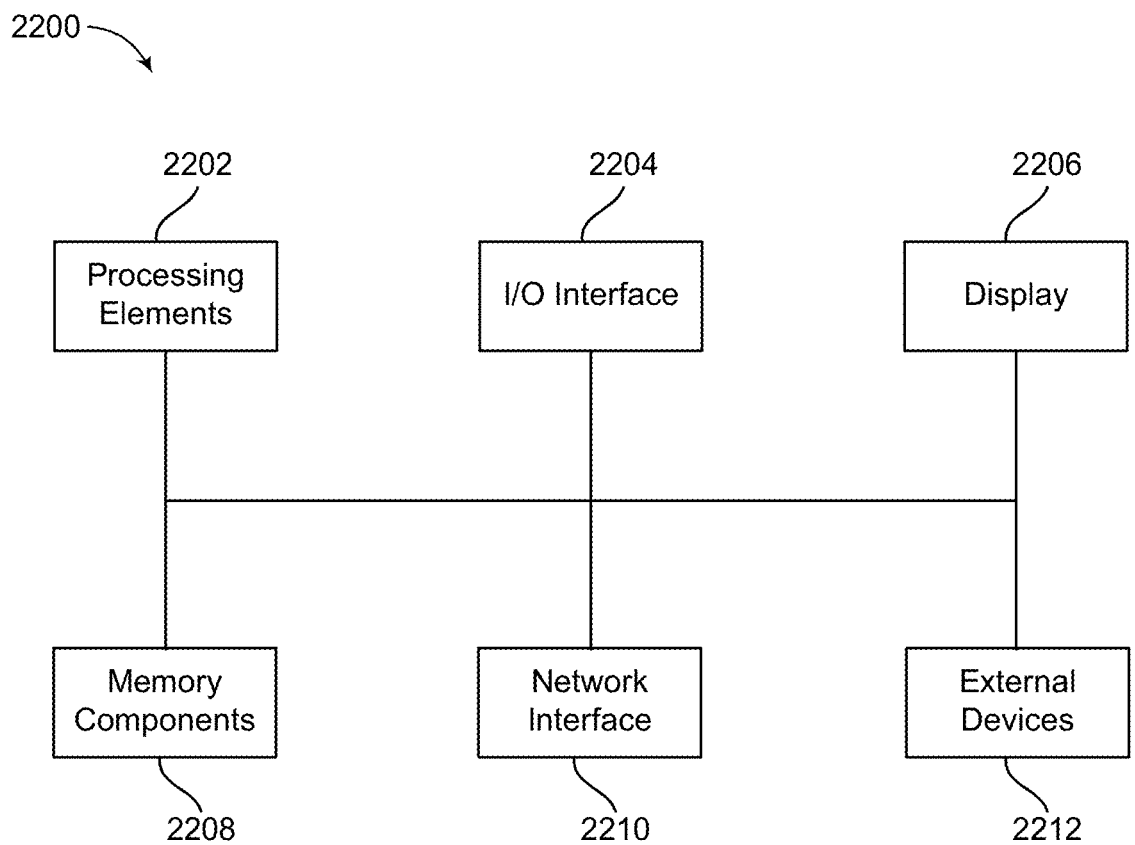
FIG. 22 is an example block diagram of a computing device that can be used to implement various systems and methods described herein.

FIG. 22 shows a simplified block structure for a computing device that may be used with the system 100 (in FIG. 1) or integrated into one or more components of the system. For example, the rental price prediction unit 104, the data processing & validation unit 106, the risk calculator 114, and the property listing rental portal 118 may include one or more of the components shown in FIG. 22 and be used to implement one or blocks or execute one or more of the operations disclosed in FIGS. 2-21. In FIG. 22, the computing device 2200 may include one or more processing elements 2202, an input/output interface 2204, a display 2206, one or more memory components 2208, a network interface 2210, and one or more external devices 2212. Each of the various components may be in communication with one another through one or more busses, wireless means, or the like.

The processing element 2202 may be any type of electronic device capable of processing, receiving, and/or transmitting instructions. For example, the processing element 2202 may be a central processing unit, microprocessor, processor, or microcontroller. Additionally, it should be noted that some components of the computer 2200 may be controlled by a first processor and other components may be controlled by a second processor, where the first and second processors may or may not be in communication with each other.

The memory components 2208 are used by the computer 2200 to store instructions for the processing element 2202, as well as store data, such as the fluid device data, historical data, and the like. The memory components 2208 may be, for example, magneto-optical storage, read-only memory, random access memory, erasable programmable memory, flash memory, or a combination of one or more types of memory components.

The display 2206 provides visual feedback to a user and, optionally, can act as an input element to enable a user to control, manipulate, and calibrate various components of the computing device 2200. The display 2206 may be a liquid crystal display, plasma display, organic light-emitting diode display, and/or cathode ray tube display. In embodiments where the display 2206 is used as an input, the display may include one or more touch or input sensors, such as capacitive touch sensors, resistive grid, or the like.

The I/O interface 2204 allows a user to enter data into the computer 2200, as well as provides an input/output for the computer 2200 to communicate with other components (e.g., prediction unit 104 in FIG. 1, other computers, speakers, etc.). The I/O interface 2204 can include one or more input buttons, touch pads, and so on.

The network interface 2210 provides communication to and from the computer 2200 to other devices. For example, the network interface 2210 allows the property listing portal 118 to communicate with the rental price prediction unit 104 or one or more systems, such as 106, 114, or one or more databases, such as 108, 110, 112 through the communication network 102 (in FIG. 1A). The network interface 2210 includes one or more communication protocols, such as, but not limited to WiFi, Ethernet, Bluetooth, and so on. The network interface 2210 may also include one or more hardwired components, such as a Universal Serial Bus (USB) cable, or the like. The configuration of the network interface 2210 depends on the types of communication desired and may be modified to communicate via WiFi, Bluetooth, and so on.

The external devices 2212 are one or more devices that can be used to provide various inputs to the computing device 2200, e.g., mouse, microphone, keyboard, trackpad, or the like. The external devices 2212 may be local or remote and may vary as desired.

The foregoing description has a broad application. For example, while examples disclosed herein may focus on a property rental system, it should be appreciated that the concepts disclosed herein may equally apply to other rental systems such as storage rental, store rental, commercial building rental, or other rental systems. Accordingly, the disclosure is meant only to provide examples of various systems and methods and is not intended to suggest that the scope of the disclosure, including the claims, is limited to these examples.

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Reference throughout this specification to features, advantages, or similar language does not imply that all of the features and advantages that may be realized with the present solution should be or are in any single embodiment thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One ordinarily skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Other advantages can be apparent to those skilled in the art from the foregoing specification. Accordingly, it will be recognized by those skilled in the art that changes, modifications, or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:

1. A system for estimating rental rates for one or more property units, comprising:
one or more processing elements; and
one or more computer-readable non-transitory storage media, the media encoded with instructions that when executed cause the one or more processing elements to perform operations comprising:
generating a rental property listing user interface configured to display rental price for one or more available rental units each having a respective asset class, wherein the rental property listing user interface includes a rental price display area configured to display data related to the one or more available rental units and an asset class input area configured to receive a user input selecting the respective asset class;
receiving information about the one or more available rental units, including the respective asset class via the asset class input area based on the user input, and including one or more amenities of the one or more available rental units via an amenity input area;
estimating, using a constrained optimization model, a maximized rental price for the one or more available rental units, wherein:
the constrained optimization model is configured to maximize a price of the one or more available rental units,
the market has a demand for a number of rental units in each respective asset class at the maximized rental price,
the market has a market capacity of vacant rental units in the asset class,
the maximization of the price is based on the market demand being less than or equal to the market capacity; and
the maximization of the price is based on the one or more amenities;
displaying the maximized rental price to the rental price display area;
generating one or more confidence levels corresponding to the one or more amenities of the one or more rental units;
displaying the one or more confidence levels to a confidence level display area of an amenity price sheet configured to facilitate comparison of respective values of the one or more amenities;
receiving, via the amenity input area, new information about the one or more available rental units, the new information comprising one or more new amenities of the one or more available rental units;
estimating, using the constrained optimization model, a new maximized rental price for the one or more available rental units;
displaying the new maximized rental price to the rental price display area;
generating one or more new confidence levels based on the new information, the new maximized rental price, or a combination thereof;
displaying the one or more new confidence levels to the confidence level display area of the amenity price sheet;
generating and displaying an additional user interface comprising a first graph of occupancy of the property during a time period and a second graph of enquiries for the property during the time period, wherein the additional user interface includes a user-selectable slider to adjust the time period;
receiving a selection from a user of the user-selectable slider, the selection indicating a different time period; and
updating the first graph and the second graph to reflect the different time period in response to the selection of the user-selectable slider.

2. The system of claim 1, wherein the rental units include multi-family apartments or single family apartments.

3. The system of claim 1, wherein the rental units include self-storage units, further comprising determining a number of expected requests for the one or more available storage units.

4. The system of claim 3, further comprising determining a seasonality element and use at least the seasonality element to determine the number of expected requests.

5. The system of claim 3, further comprising determining a success rate parameter and using at least the success rate parameter to determine the number of expected requests.

6. The system of claim 3, further comprising determining a churn function and using at least the churn function to determine the number of expected requests.

7. The system of claim 1, further comprising receiving a number of enquiries for the one or more available rental units in a period of time and using the information about the one or more available rental units and the number of enquiries to generate the constrained optimization model.

8. The system of claim 1, wherein the operations further comprise displaying, in a top amenities display area of the amenity price sheet, at least one top amenity for a geographic region in which the one or more rental units are located together with an impact to rent associated with the at least one top amenity.

9. A system for estimating rental rates for one or more apartments, comprising:
one or more processing elements; and
one or more computer-readable non-transitory storage media, the media encoded with instructions that when executed cause the one or more processing elements to perform operations comprising:
generating an apartment listing user interface configured to display rental price for one or more available apartment units, wherein the apartment listing user interface includes a rental price display area configured to display data related to the one or more available apartment units;
receiving information about the one or more available apartment units, the information including one or more amenities of the one or more available apartment units via an amenity input area;
estimating a price elasticity and a success rate parameter using a Kalman filter for a dynamic programming model;
using the estimated price elasticity and the estimated success rate parameter in the dynamic programming model to estimate a rental price for each of the one or more available apartment units;

displaying the rental price to the rental price display area;

generating one or more confidence levels corresponding to the one or more amenities of the one or more rental units;

displaying the one or more confidence levels to a confidence level display area of an amenity price sheet configured to facilitate comparison of respective values of the one or more amenities receiving, via the amenity input area, new information about the one or more available apartment units, the new information comprising one or more new amenities of the one or more available apartment units;

estimating a new maximized rental price for the one or more available apartment units;

displaying the new maximized rental price to the rental price display area;

generating one or more new confidence levels based on the new information, the new maximized rental price, or a combination thereof;

displaying the one or more new confidence levels to the confidence level display area the amenity price sheet;

generating and displaying an additional user interface comprising a first graph of occupancy of the property during a time period and a second graph of enquiries for the property during the time period, wherein the additional user interface includes a user-selectable slider to adjust the time period;

receiving a selection from a user of the user-selectable slider, the selection indicating a different time period; and updating the first graph and the second graph to reflect the different time period in response to the selection of the user-selectable slider.

10. The system of claim 9, further comprising predicting a price of the one or more amenities for each of the one or more available apartment units.

11. The system of claim 10, further comprising predicting the price of an amenity of the one or more amenities associated with an available apartment unit of the one or more available apartment units by determining a partial dependence of one or more features corresponding to the amenity on the predicted rental price for that available apartment unit.

12. The system of claim 11, further comprising determining a confidence level of the one or more confidence levels associated with the predicted price for the amenity associated with the available apartment unit.

13. A system comprising:
one or more processing elements; and
one or more computer-readable non-transitory storage media, the media encoded with instructions that when executed cause the one or more processing elements to perform operations comprising:
generating a rental property listing user interface configured to display delist time for one or more available rental units each having a respective asset class, wherein the rental property listing user interface includes a rental data display area configured to display data related to the one or more available rental units and an asset class input area configured to receive a user input selecting the respective asset class;
receiving data about the one or more available rental units, including the respective asset class via the asset class input area based on the user input, and including one or more amenities of the one or more available rental units via an amenity input area;
extracting features from the data, including the respective asset class;
fitting a random forest model over the extracted features based at least on relative rent value;
receiving a rental price;
determining a delist time based on the random forest model and the rental price;
displaying the delist time to the rental data display area;
generating one or more confidence levels corresponding to the one or more amenities of the one or more rental units;
displaying the one or more confidence levels to a confidence level display area of an amenity price sheet configured to facilitate comparison of respective values of the one or more amenities receiving, via the amenity input area, new data about the one or more available rental units, the new data comprising one or more new amenities of the one or more available rental units;
receiving a new rental price;
determining, based on the random forest model and the new rental price, a new delist time;
displaying the new delist time to the rental data display area;
generating one or more new confidence levels based on the new data, the new rental price, the new delist time, or a combination thereof,
displaying the one or more new confidence levels to the confidence level display area of the amenity price sheet;
generating and displaying an additional user interface comprising a first graph of occupancy of the property during a time period and a second graph of enquiries for the property during the time period, wherein the additional user interface includes a user-selectable slider to adjust the time period;
receiving a selection from a user of the user-selectable slider, the selection indicating a different time period; and
updating the first graph and the second graph to reflect the different time period in response to the selection of the user-selectable slider.

14. The system of claim 13, wherein the data about the one or more available rental units includes a rental history comprising a plurality of rental record, each pertaining to a rental property unit and including one or more of: postcode of the rental property unit, a number of bedrooms in the rental property unit, a rental rate of the rental property unit, one or more key features of the rental property unit, or one or more points of interest in a neighborhood of the rental property unit.

15. A method comprising:
generating, via a processing unit, a rental property listing user interface configured to display rental price for one or more available rental units each having a respective asset class, wherein the rental property listing user interface includes a rental price display area configured to display data related to the one or more available rental units and an asset class input area configured to receive a user input selecting the respective asset class;
receiving, via the processing unit, information about one or more available rental units, including the respective asset class via asset class input area based on the user input, and including one or more amenities of the one or more available rental units via an amenity input area;

estimating using a constrained optimization-model, executed by the processing element, a maximized rental price for the one or more available rental units, wherein:
the constrained optimization model is configured to maximize a price of the one or more available rental units,
the market has a demand for a number of rental units in each respective asset class at the maximized rental price,
the market has a market capacity of vacant rental units in the asset class,
the maximization of the price is based on the market demand being less than or equal to the market capacity; and
the maximization of the price is based on the one or more amenities;
displaying the maximized rental price to the rental price display area;
generating one or more confidence levels corresponding to the one or more amenities of the one or more rental units;
displaying the one or more confidence levels to a confidence level display area of an amenity price sheet configured to facilitate comparison of respective values of the one or more amenities
receiving, via the amenity input area, new information about the one or more available rental units, the new information comprising one or more new amenities of the one or more available rental units;
estimating using the constrained optimization model, a new maximized rental price for the one or more available rental units;
displaying the new maximized rental price to the rental price display area;
generating one or more new confidence levels based on the new information, the new maximized rental price, or a combination thereof;
displaying the one or more new confidence levels to the confidence level display area the amenity price sheet
generating and displaying an additional user interface comprising a first graph of occupancy of the property during a time period and a second graph of enquiries for the property during the time period, wherein the additional user interface includes a user-selectable slider to adjust the time period;
receiving a selection from a user of the user-selectable slider, the selection indicating a different time period; and
updating the first graph and the second graph to reflect the different time period in response to the selection of the user-selectable slider.

16. The method of claim 15 further comprising: receiving, via the processing element, a number of enquiries for the one or more available rental units in a period of time; using the information about the one or more available rental units and the number of enquiries to generate, via the processing element, the constrained optimization model.

17. The method of claim 15 further comprising predicting, via the processing element, a price of the one or more amenities for each of the one or more available rental units and the one or more amenities include one or more of any of hardware floor, stainless steel appliances, air conditioning, storage unit, heating, dishwasher, walk-in-closet, or vaulted ceiling.

18. The method of claim 17, wherein predicting the price of the one or more amenities comprises determining a partial dependence of one or more features corresponding to an amenity of the one or more amenities of an available rental unit of the one or more available rental units on the predicted rental price for that available rental unit.

* * * * *